US008438598B2

(12) United States Patent
Sakai et al.

(10) Patent No.: US 8,438,598 B2
(45) Date of Patent: May 7, 2013

(54) INFORMATION PROCESSING APPARATUS, INFORMATION PROCESSING METHOD, PROGRAM, AND INFORMATION SHARING SYSTEM

(75) Inventors: Yusuke Sakai, Kanagawa (JP); Tomohiro Tsunoda, Tokyo (JP); Kazuto Mugura, Tokyo (JP); Tomohiro Ishii, Tokyo (JP); Yuki Shoji, Tokyo (JP)

(73) Assignee: Sony Corporation, Tokyo (JP)

( * ) Notice: Subject to any disclaimer, the term of this patent is extended or adjusted under 35 U.S.C. 154(b) by 631 days.

(21) Appl. No.: 12/272,414

(22) Filed: Nov. 17, 2008

(65) Prior Publication Data

US 2009/0133071 A1    May 21, 2009

(30) Foreign Application Priority Data

Nov. 16, 2007    (JP) ................. P2007-298616

(51) Int. Cl.
*H04N 5/445*    (2011.01)
(52) U.S. Cl.
USPC ............................................. 725/46; 725/37
(58) Field of Classification Search .................. None
See application file for complete search history.

(56) References Cited

U.S. PATENT DOCUMENTS

| 2003/0093790 | A1* | 5/2003 | Logan et al. ............. 725/38 |
| 2008/0222680 | A1* | 9/2008 | Murakami .............. 725/46 |
| 2009/0064243 | A1* | 3/2009 | Ku et al. ............... 725/93 |

FOREIGN PATENT DOCUMENTS

| JP | 2002-300616 | 10/2002 |
| JP | 2004-173252 | 6/2004 |
| JP | 2006-041587 | 2/2006 |
| JP | 2006-50370  | 2/2006 |
| JP | 2007-060398 | 3/2007 |

OTHER PUBLICATIONS

Japanese Office Action dated Nov. 20, 2012, in Japanese Patent Application No. 2008-290176.

* cited by examiner

*Primary Examiner* — Chenea Smith
(74) *Attorney, Agent, or Firm* — Oblon, Spivak, McClelland, Maier & Neustadt, L.L.P.

(57) ABSTRACT

There is provided an information processing apparatus communicable with a plurality of content viewing devices via a network, including a viewing information receiving unit for receiving viewing information of a user in the past, present, and future from each of the content viewing devices, a user viewing content management unit for managing a user viewing content DB based on the viewing information received from each of the content viewing devices and a program guide, the user viewing content DB associating, in a form of program guide, past, present, and future contents represented in the program guide and identification information of users who have viewed the past content, those who are viewing the present content, and those who will view the future content, and a viewing information transmitting unit for transmitting the extracted viewing information of another user to the requesting content viewing device.

10 Claims, 33 Drawing Sheets

GROUP X/GROUP DB

| USER ID | USER NAME |
|---------|-----------|
| 001 | USER A |
| 002 | USER B |
| 003 | USER C |
| 004 | USER D |
| 005 | USER E |
| 006 | USER F |
| 007 | USER G |
| ⋮ | ⋮ |

FIG.9

USER A/USER CORRELATION INFORMATION

| USER ID | CLOSENESS LEVEL VALUE |
|---|---|
| — | — |
| 002 | 3 |
| 003 | 2 |
| 004 | 5 |
| 005 | 1 |
| 006 | 2 |
| 007 | 4 |
| ... | ... |

USER B/USER CORRELATION INFORMATION

| USER ID | CLOSENESS LEVEL VALUE |
|---|---|
| 001 | 3 |
| — | — |
| 003 | 3 |
| 004 | 1 |
| 005 | 4 |
| 006 | 3 |
| 007 | 2 |
| ... | ... |

USER C/USER CORRELATION INFORMATION ~216

| USER ID | CLOSENESS LEVEL VALUE |
|---|---|
| 001 | 2 |
| 002 | 3 |
| — | — |
| 004 | 4 |
| 005 | 5 |
| 006 | 3 |
| 007 | 3 |
| ... | ... |

FIG.10

USER A/INFORMATION DISCLOSURE LEVEL INFORMATION

| USER ID | DISCLOSURE LEVEL VALUE |
|---|---|
| 001 | 3 |

USER A/INFORMATION ACQUISITION LEVEL INFORMATION

| USER ID | ACQUISITION LEVEL VALUE |
|---|---|
| 001 | 3 |

~216

USER B/INFORMATION DISCLOSURE LEVEL INFORMATION

| USER ID | DISCLOSURE LEVEL VALUE |
|---|---|
| 002 | 3 |

USER B/INFORMATION ACQUISITION LEVEL INFORMATION

| USER ID | ACQUISITION LEVEL VALUE |
|---|---|
| 002 | 4 |

USER C/INFORMATION DISCLOSURE LEVEL INFORMATION

| USER ID | DISCLOSURE LEVEL VALUE |
|---|---|
| 003 | 1 |

USER C/INFORMATION ACQUISITION LEVEL INFORMATION

| USER ID | ACQUISITION LEVEL VALUE |
|---|---|
| 003 | 1 |

FIG.11

USER A/VIEWING INFORMATION

EXAMPLE-1: WHEN VIEWING TV BROADCAST CONTENT

| ITEM | VALUE |
|---|---|
| MEDIA | BS DIGITAL BROADCASTING |
| CHANNEL | 123ch |
| CONTENT ID | 000456 |
| VIEWING START TIME | 01/01 12:00 |
| VIEWING DURATION | 00:25 |
| PLANNED VIEWING 001 | 01/03 16:15 CS/081ch |
| PLANNED VIEWING 002 | 01/05 22:16 BS/030ch |
| ⋮ | ⋮ |

EXAMPLE-2: WHEN VIEWING VOD CONTENT

| ITEM | VALUE |
|---|---|
| MEDIA | VOD |
| CHANNEL | 001ch |
| CONTENT ID | 456789 |
| VIEWING START TIME | 05/12 22:00 |
| VIEWING DURATION | 01:40 |
| PLANNED VIEWING 001 | 05/23 19:00 112233 |
| PLANNED VIEWING 002 | 05/30 22:00 445566 |
| ⋮ | ⋮ |

USER A/USER VIEWING DB

| VIEWING ID | VIEWING DATE/TIME | CONTENT IDENTIFICATION INFORMATION | VIEWING ATTRIBUTE | |
|---|---|---|---|---|
| ... | ... | ... | ... | |
| 773 | 01/01 12:00 | BS/123ch | PAST HISTORY | PAST HISTORY |
| 774 | 01/15 18:00 | CS/081ch | PAST HISTORY | |
| 775 | 02/01 22:00 | BS/030ch | PRESENT STATE | PRESENT STATE |
| 776 | 02/08 06:00 | 445566 | PLANNED VIEWING | FUTURE PLAN |
| ... | ... | ... | ... | |

CONTENT INFORMATION DB

| DATE/TIME | BROADCASTING CHANNEL | DELIVERY CHANNEL | |
|---|---|---|---|
| ... | ... | ... | |
| 10:00 | CONTENT ID 01 | CONTENT ID 11 | PAST HISTORY |
| 11:00 | CONTENT ID 02 | CONTENT ID 12 | |
| 12:00 | CONTENT ID 03 | CONTENT ID 13 | PRESENT STATE |
| 13:00 | CONTENT ID 04 | CONTENT ID 14 | FUTURE PLAN |
| 14:00 | CONTENT ID 05 | CONTENT ID 15 | |
| ... | ... | ... | |

FIG.14

GROUP X/USER VIEWING CONTENT DB ~228

| DATE/TIME | BROADCASTING CHANNEL | VIEWING USER INFORMATION | |
|---|---|---|---|
| ... | ... | ... | |
| 10:00 | CONTENT ID 01 | USER A, USER C | PAST HISTORY |
| 11:00 | CONTENT ID 02 | | |
| 12:00 | CONTENT ID 03 | USER A, USER B, USER C, ... | PRESENT STATE |
| 13:00 | CONTENT ID 04 | USER D (80%) | FUTURE PLAN |
| ... | ... | ... | |

FIG.15

USER VIEWING CONTENT DB FILTERED FOR USER A  ~228

| DATE/TIME | BROADCASTING CHANNEL | VIEWING USER INFORMATION | |
|---|---|---|---|
| ... | ... | ... | |
| 10:00 | CONTENT ID 01 | USER A, ~~USER C~~ | PAST HISTORY |
| 11:00 | CONTENT ID 02 | USER A, USER B, <u>USER C</u>, ... | PRESENT STATE |
| 12:00 | CONTENT ID 03 | USER D (80%) | FUTURE PLAN |
| 13:00 | CONTENT ID 04 | | |
| ... | ... | ... | |

FIG.16

USER A/USER VIEWING DB ~222

| VIEWING ID | VIEWING DATE/TIME | CONTENT IDENTIFICATION INFORMATION | VIEWING ATTRIBUTE | |
|---|---|---|---|---|
| ... | ... | ... | ... | |
| 773 | 01/01 12:00 | BS/123ch | PAST HISTORY | PAST HISTORY |
| 774 | 01/15 18:00 | CS/081ch | PAST HISTORY | |
| 775 | 02/01 22:00 | BS/030ch | PRESENT STATE | PRESENT STATE |
| 776 | 02/08 06:00 | 445566 | PLANNED VIEWING | FUTURE PLAN |
| 777 | 03/11 09:00 | 112233 | PREDICTED VIEWING (80%) | FUTURE PREDICTION |
| ... | ... | ... | ... | |

GROUP X/USER VIEWING CONTENT DB (INCLUDING FUTURE PREDICTION)

| DATE/TIME | BROADCASTING CHANNEL | VIEWING USER INFORMATION | |
|---|---|---|---|
| ... | ... | | |
| 10:00 | CONTENT ID 01 | USER A, USER C | PAST HISTORY |
| 11:00 | CONTENT ID 02 | | |
| 12:00 | CONTENT ID 03 | USER A, USER B, USER C | PRESENT STATE |
| 13:00 | CONTENT ID 04 | USER D (80%) | FUTURE PLAN |
| 14:00 | CONTENT ID 05 | USER A (100%), USER B (40%) | FUTURE PREDICTION |
| ... | ... | | |

USER VIEWING CONTENT DB FILTERED FOR USER A (INCLUDING FUTURE PREDICTION)

| DATE/TIME | BROADCASTING CHANNEL | VIEWING USER INFORMATION | |
|---|---|---|---|
| ... | | | |
| 10:00 | CONTENT ID 01 | USER A, ~~USER C~~ | PAST HISTORY |
| 11:00 | CONTENT ID 02 | | |
| 12:00 | CONTENT ID 03 | USER A, USER B, ~~USER C~~ | PRESENT STATE |
| 13:00 | CONTENT ID 04 | USER D (80%) | FUTURE PLAN |
| 14:00 | CONTENT ID 05 | USER A (100%), USER B (40%) | FUTURE PREDICTION |
| ... | | | |

INFORMATION PROCESSING APPARATUS, INFORMATION PROCESSING METHOD, PROGRAM, AND INFORMATION SHARING SYSTEM

CROSS-REFERENCE TO RELATED APPLICATION

The present application contains subject matter related to Japanese Patent Application JP 2007-298616 filed in the Japan Patent Office on Nov. 16, 2007, the entire contents of which being incorporated herein by reference.

BACKGROUND OF THE INVENTION

1. Field of the Invention

The present invention relates to an information processing apparatus, an information processing method, a computer program product, and an information sharing system.

2. Description of the Related Art

With computerization of various household electrical appliances in recent years, TV sets, for example, not only receive and display video and audio content of programs from broadcasting stations, but also have a function to acquire and display various kinds of information such as a program guide. In addition, if a TV set has a network communication function, the TV set can communicate various kinds of information with other TV sets.

SUMMARY OF THE INVENTION

When a user selects content to view in a TV set or the like (e.g., on a computer monitor, mobile phone, or PDA), the user generally refers to a content list, such as an electronic program guide, to select content. However, as recognized by the present inventors, in the related art, viewing information of another user can not be displayed with a program guide indicating past, present and future contents. Further, it is also difficult to present viewing information of a plurality of other users in a form of program guide by chronologically classifying the viewing information on content basis.

In view of the above issues, there is a need for providing a new and improved information processing apparatus, information processing method, program, and information sharing system capable of selecting content, when a user thereof selects content to view by looking up a program guide, by referring to viewing information of other users associated with the program guide.

According to an embodiment of the present invention, there is provided an information processing apparatus communicable with a plurality of content viewing devices via a network, including: a viewing information receiving unit for receiving, from each of the content viewing devices, viewing information including information representing at least one of content viewed by a user in the past with each of the content viewing devices, content being viewed by the user at the present, and content planned to be viewed by the user in the future; a user viewing content management unit for managing a user viewing content database based on the viewing information received from each of the content viewing devices and a program guide indicating a plurality of contents that can be provided to each of the content viewing devices, the user viewing content database associating, in a form of program guide, past, present, and future contents represented in the program guide and identification information of users who have viewed the past content, those who are viewing the present content, and those who will view the future content; an information extraction unit for extracting the viewing information of another user including information representing content viewed by another user in the past, content being viewed by another user at the present, and content to be viewed by another user in the future from the user viewing content database in response to receipt of a request for the viewing information of another user from the content viewing device; and a viewing information transmitting unit for transmitting the extracted viewing information of another user to the requesting content viewing device.

The information processing apparatus, further includes: a user viewing prediction unit for predicting content that may viewed by the user of each of the content viewing devices based on the viewing information received from each of the content viewing devices and attribute information of content contained in the program guide, wherein the user viewing content management unit generates the user viewing content database by associating future content represented in the program guide and the user predicted by the user viewing prediction unit to view the future content.

Further, the user viewing prediction unit calculates a viewing probability that the future content will be viewed by the user of each of the content viewing devices based on a predetermined algorithm using the viewing information received from each of the content viewing devices and the attribute information of content contained in the program guide, and the user viewing content management unit generates the user viewing content database by associating future content represented in the program guide and information about the viewing probability calculated by the user viewing prediction unit.

According to another embodiment of the present invention, there is provided an information processing method in an information processing apparatus communicable with a plurality of content viewing devices via a network, including the steps of: receiving, from each of the content viewing devices, viewing information including information representing at least one of content viewed by a user in the past with each of the content viewing devices, content being viewed by the user at the present, and content to be viewed by the user in the future; managing a user viewing content database based on the viewing information received from each of the content viewing devices and a program guide indicating a plurality contents that can be provided to each of the content viewing devices, the user viewing content database associating, in a form of program guide, past, present, and future contents represented in the program guide and identification information of users who have viewed the past content, those who are viewing the present content, and those who will view the future content; extracting the viewing information of another user including information representing content viewed by another user in the past, content being viewed by another user at the present, and content to be viewed by another user in the future from the user viewing content database in response to a request for viewing information of another user from the content viewing device; and transmitting the extracted viewing information of another user to the requesting content viewing device.

According to another embodiment of the present invention, there is provided a program causing an information processing apparatus communicable with a plurality of content viewing devices via a network to execute the steps of: receiving, from each of the content viewing devices, viewing information including information representing at least one of content viewed by a user with in the past each of the content viewing devices, content being viewed by the user at the present, and content to be viewed by the user in the future; managing a user viewing content database based on the viewing information received from each of the content viewing devices and a program guide indicating a plurality of contents that can be provided to each of the content viewing devices, the user viewing content database associating, in a form of program guide, past, present, and future contents represented in the program guide and identification information of users who have viewed the past content, those who are viewing the present content, and those who will view the future content; extracting the viewing information of another user including information representing content viewed by another user in the past, content being viewed by another user at the present, and content to be viewed by another user in the future from the user viewing content database in response to a request for viewing information of another user from the content viewing device; and transmitting the extracted viewing information of another user to the requesting content viewing device.

According to another embodiment of the present invention, there is provided an information sharing system including a plurality of content viewing devices for viewing content provided by a content providing device and an information processing apparatus communicable with the content viewing devices via a network, wherein the information processing apparatus includes: a viewing information receiving unit for receiving, from each of the content viewing devices, viewing information including information representing at least one of content viewed by a user in the past with each of the content viewing devices, content being viewed by the user at the present, and content to be viewed by the user in the future;

a user viewing content management unit for managing a user viewing content database based on the viewing information received from each of the content viewing devices and a program guide indicating a plurality of contents that can be provided to each of the content viewing devices, the user viewing content database associates, in a form of program guide, past, present, and future contents represented in the program guide and identification information of users who have viewed the past content, those who are viewing the present content, and those who will view the future content; an information extraction unit for extracting the viewing information of another user including information representing content viewed by another user in the past, content being viewed by another user at the present, and content to be viewed by another user in the future from the user viewing content database in response to a request for viewing information of another user from the content viewing device; and a viewing information transmitting unit for transmitting the extracted viewing information of another user to the requesting content viewing device, and the content viewing device includes: a viewing information transmitting unit for transmitting to the information processing apparatus the viewing information including information representing at least one of content viewed by a user in the past with each of the content viewing devices, content being viewed by the user at the present, and content to be viewed by the user in the future; a viewing information receiving unit for receiving the extracted viewing information of another user from the information processing apparatus; and a display unit for displaying the extracted viewing information of another user in a form of program guide.

According to these and other embodiments of the present invention, content can be selected by referring to viewing information of other users associated with a program guide when a user selects content to view by looking up the program guide.

BRIEF DESCRIPTION OF THE DRAWINGS

FIG. 8 is an explanatory diagram showing group information of a group DB according to the first embodiment;

FIG. 9 is an explanatory diagram showing user correlation information of the group DB according to the first embodiment;

FIG. 10 is an explanatory diagram showing information disclosure level information and information acquisition level information of the group DB according to the first embodiment;

FIG. 11 is an explanatory diagram showing user viewing information according to the first embodiment;

FIG. 12 is an explanatory diagram showing a user viewing DB according to the first embodiment;

FIG. 13 is an explanatory diagram showing a content information DB according to the first embodiment;

FIG. 14 is an explanatory diagram showing a user viewing content DB according to the first embodiment;

FIG. 15 is an explanatory diagram showing the filtered user viewing content DB according to the first embodiment;

FIG. 16 is an explanatory diagram showing the user viewing DB according to the modification of the present embodiment;

FIG. 17 is an explanatory diagram showing the user viewing content DB according to the modification of the present embodiment;

FIG. 18 is an explanatory diagram showing the filtered user viewing content DB according to the modification of the present embodiment;

DETAILED DESCRIPTION OF THE PREFERRED EMBODIMENTS

Figure 1:
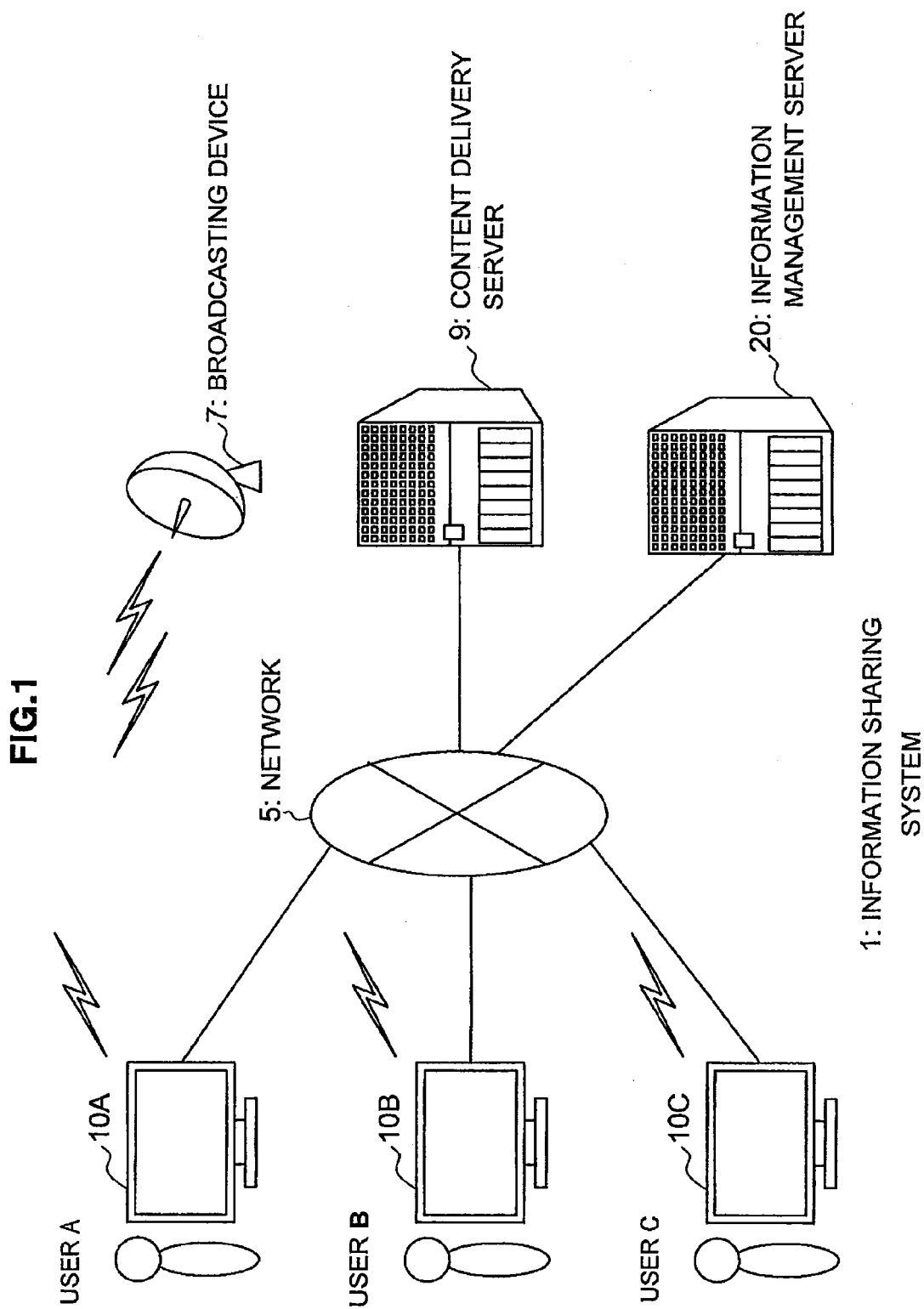
FIG. 1 is a schematic configuration diagram showing an information sharing system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these elements is omitted.

First Embodiment

First, an overview of an information sharing system according to the first embodiment of the present invention will be provided with reference to FIG. 1. FIG. 1 is a schematic configuration diagram showing the information sharing system according to the first embodiment of the present invention.

As shown in FIG. 1, an information sharing system 1 according to the present embodiment includes a plurality of content viewing devices 10A, 10B, 10C, . . . (hereinafter, may generically be called the "content viewing device 10") used by a plurality of users A, B, C, . . . respectively, an information management server 20, a broadcasting device 7 of a broadcasting station, a content delivery server 9, and a network 5 mutually connecting these devices.

The network 5 is a communication network that mutually communicably connects the content viewing device 10 and the information management server 20 and it makes no difference whether the network 5 is wired or wireless. Public networks such as the Internet, telephone networks, and satellite communication networks or private networks such as various kinds of LAN (local area network) including Ethernet (registered trademark), WAN (wide area network), and IP-VPN (Internet protocol-virtual private network) can be used the network 5. Thus, the network 5 is neither restricted to all-wired, or all-wireless networks.

Figure 3:
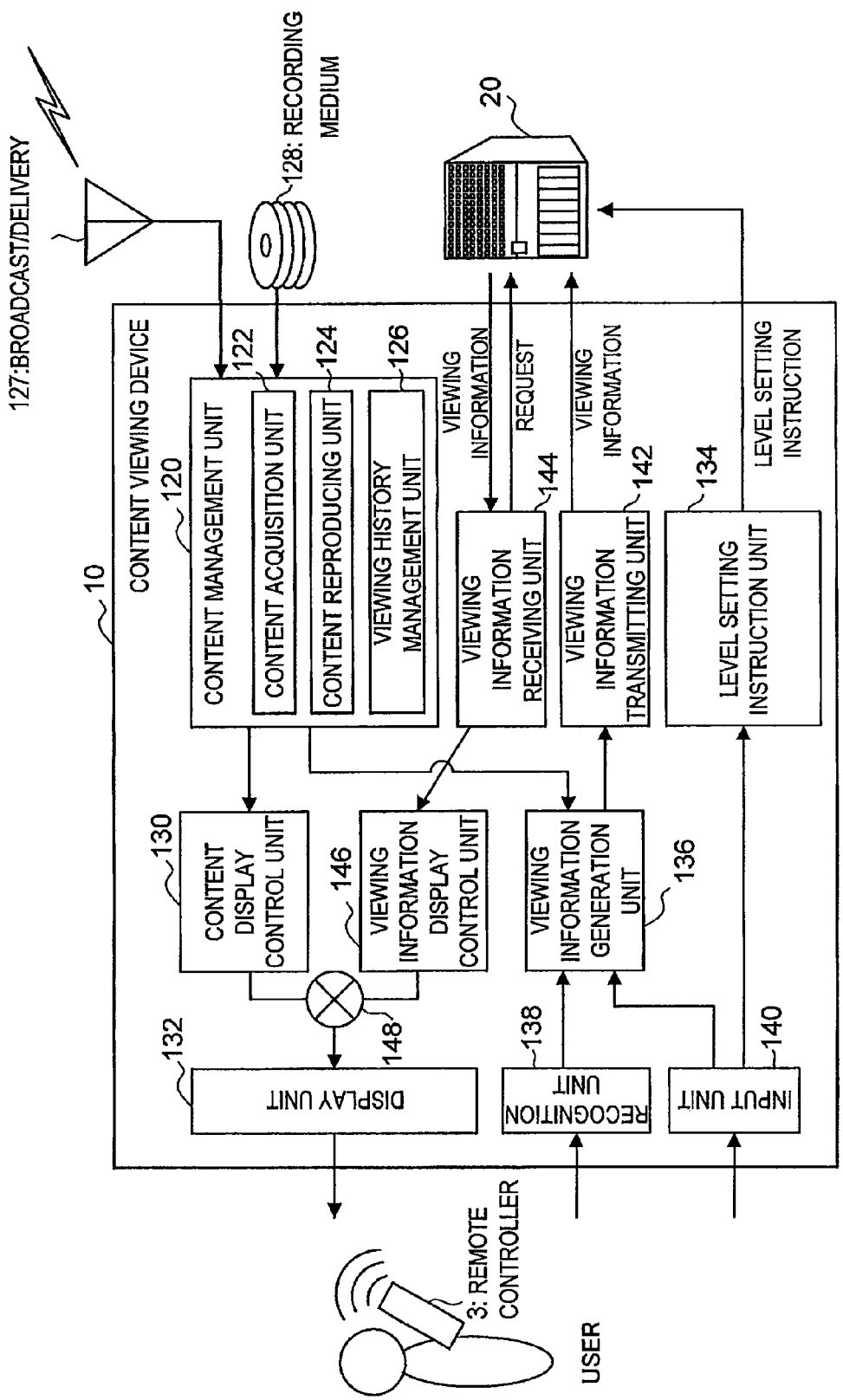
FIG. 3 is a block diagram showing the configuration of a content viewing device according to the first embodiment.

The broadcasting device 7 and the content delivery server 9 are configured as an example of content providing device to provide content. The broadcasting device 7 is installed in a broadcasting station and transmits program content of TV broadcasting to content viewing device/devices 10 (devices 10A, 10B, and 10C as shown in FIG. 1, a more detailed view of which is shown in FIG. 3) via, for example, airwaves or private communication networks. Broadcast programs provided by the broadcasting device 7 may be programs of TV broadcasting of any system such as broadcasting satellite (BS) broadcasting, communication satellite (CS) broadcasting, digital terrestrial broadcasting, analog terrestrial broadcasting, and cable broadcasting.

The content delivery server 9 transmits delivery content such as movies and music to the content viewing devices 10 via the network 5. The content delivery server 9 includes, for example, an IPTV server providing program content of IPTV (Internet protocol television), a VOD server providing VOD (video on demand) content, or an electronic music delivery server delivering music content.

The content viewing device 10 is a device used for looking and listening by reproducing content. The content viewing device 10 can be constructed from any device that can acquire content from outside and reproduce the content. An example in which the content viewing device 10 is a TV set that receives and reproduces program content of TV broadcasting will be described below (see FIG. 1). However, the content viewing device according to an embodiment of the present invention is not limited to this example and may be a personal computer (PC), various kinds of computer devices such as a server device, a record reproducing device such as a DVD/HDD player/record, a home information appliance including a home game machine, a mobile phone, a PDA (personal digital assistant), a mobile game machine, and a mobile terminal such as a mobile video/audio player. The content viewing device can be applied, for example, to a mobile terminal such as a mobile phone capable of receiving and reproducing program content of one-segment broadcasting.

The content viewing device 10 receives content from a content providing device such as the broadcasting device 7 and the content delivery server 9 via the network 5 and reproduces the content. A user of the content viewing device 10 can thereby view reproduced content. Here, viewing includes looking at reproduced content of video content, listening to reproduced content of audio content, or both. When content is program content, both an action of looking at program video and that of listening to program audio correspond to viewing. The content viewing device 10 can also acquire content from the other content viewing devices 10 via the network 5 or a removable recording medium (see reference numeral 128 in FIG. 3) such as an optical disk (for example, DVD or CD) or memory card.

Content to be viewed in the content viewing device 10 may be any kind of content, for example, video content consisting of still images or moving images constituting TV programs, movies, video programs, photos, pictures, or graphics, audio content such as music, lectures, and radio programs, E-book, games, and software. Hereinafter, program content of TV broadcasting is taken as an example of content to describe the present embodiment, but the present invention is not limited to this example.

The content viewing device 10 stores information (viewing information) about content viewing by users of the content viewing device 10 itself. The viewing information is information representing a viewing history of content, viewing settings, and user viewing states and details thereof will be described later. The content viewing device 10 transmits viewing information of users of the content viewing device 10 to the information management server 20 via the network 5. The content viewing device 10 also receives viewing information of other users of the other content viewing devices 10 (e.g., devices 10A, 10B or 10C in FIG. 1) from the information management server 20 via the network 5 and displays the received viewing information of other users by associating with content. For example, the content viewing device 10A of the user A transmits information indicating content A currently being viewed by the user A to the information management server 20 as viewing information of the user A. Then, the content viewing device 10A receives information indicating the other users B and C currently viewing the same content A from the information management server 20 as viewing information of the users B and C and displays the information in parallel with video of the content A being reproduced. Accordingly, the user A can know that the other users B and C are viewing the same content A.

The information management server 20 is an example of the information processing apparatus of the present invention and has a function to manage viewing information of users in each of the content viewing devices 10. The information management server 20 is constituted by a computer device and can communicate with each of the content viewing devices 10 via the network 5. The information management server 20 receives viewing information of each user from each of the content viewing devices 10 and stores the viewing information in a database by associating with a content program guide. Then, in response to a request from the content viewing device 10, the information management server 20 transmits viewing information of other users to the content viewing device 10. Accordingly, viewing information of each user can be shared among the plurality of content viewing devices 10 of the plurality of users so that the user can know mutual viewing status.

In the foregoing, an outline configuration of the information sharing system 1 according to the present embodiment has been described. The content viewing device 10 and the information management server 20 constituting the information sharing system 1 will be described below.

Figure 2:
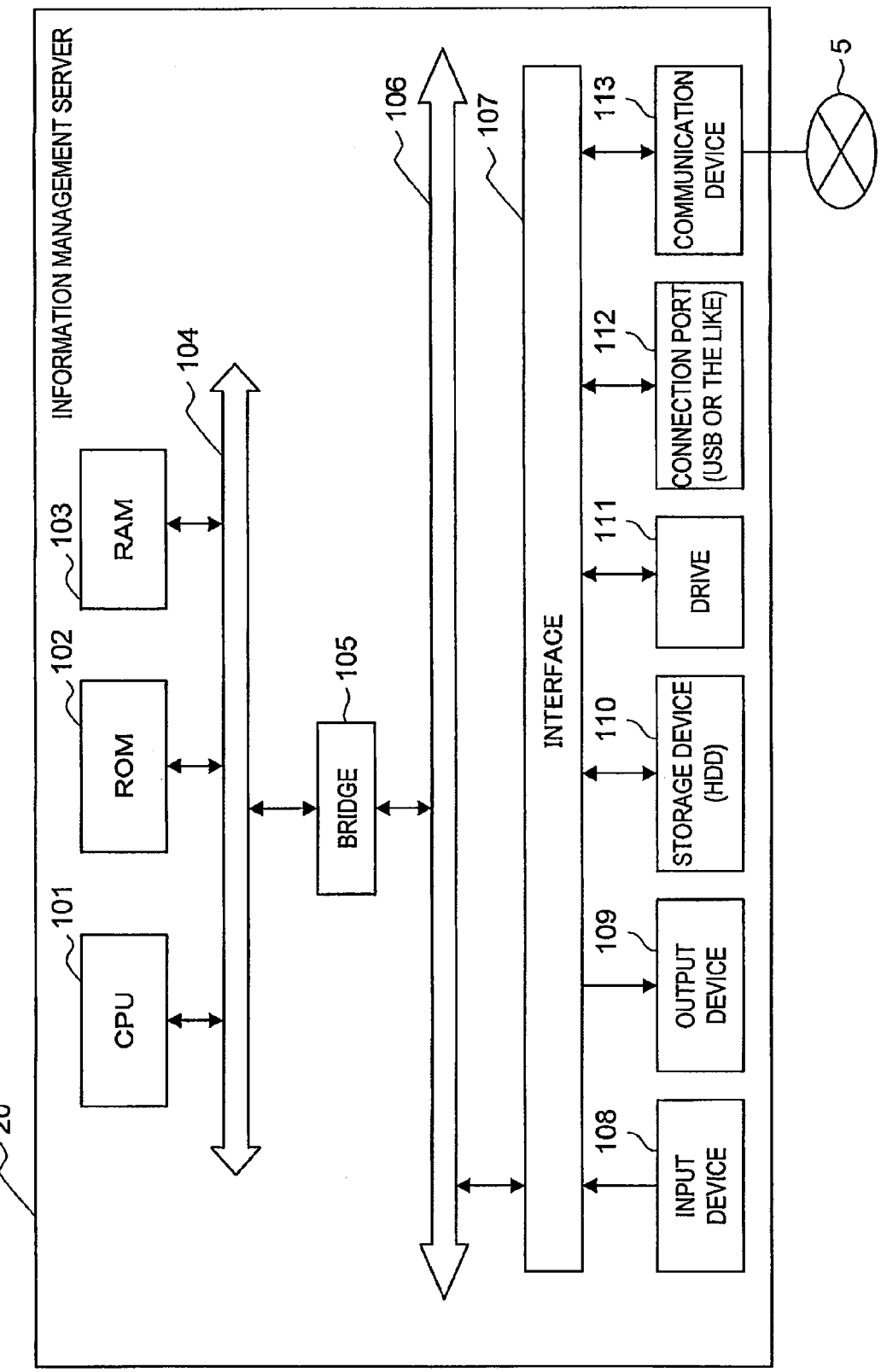
FIG. 2 is a block diagram showing a hardware configuration of an information management server according to the first embodiment.

First, the hardware configuration of the information management server 20 according to the present invention will be described with reference to FIG. 2. FIG. 2 is a block diagram showing the hardware configuration of the information management server 20.

As shown in FIG. 2, the information management server 20 includes, for example, a CPU (central processing unit) 101, a ROM (read only memory) 102, a RAM (random access memory) 103, a host bus 104, a bridge 105, an external bus 106, an interface 107, an input device 108, an output device 109, a storage device (HDD) 110, a drive 111, a connection port 112, and a communication device 113. As described above, the information management server 20 can be constituted, for example, by using a general information processing apparatus.

The CPU 101 functions as an arithmetic processing unit and also as a control device, operates following various programs, and controls each component in the information management server 20. The CPU 101 performs various kinds of processing following programs stored in the ROM 102 or programs load from the storage device 110 into the RAM 103. The ROM 102 stores programs, operations parameters and the like used by the CPU 101 and also functions as a buffer to alleviate access to the storage device 110. The RAM 103 temporarily stores programs used for execution of the CPU 101, parameters changing appropriately for execution thereof and the like. These devices are mutually connected by the host bus 104 made of a CPU bus or the like. The host bus 104 is connected to the external bus 106 such as a PCI (peripheral component interconnect/interface) bus via the bridge 105.

The input device 108 is constituted by an operation device such as a mouse, keyboard, touch panel, button, switch, and lever, and an input control circuit to generate an input signal and to output the input signal to the CPU 101. The output device 109 is constituted by, for example, by a display device such as a CRT (cathode ray tube) display device, liquid crystal display (LCD) device, and lamp and an audio output device such as a speaker.

The storage device 110 is constituted as an example of the storage unit of the information management server 20 according to the present embodiment. The storage device 110 is a device for storing various kinds of information and is constituted, for example, by a HDD (hard disk drive). The storage device 110 drives a hard disk, which is a recording medium, and stores programs executed by the CPU 101 and various kinds of data. The drive 111 is a recording medium reader/writer and is contained in the information management server 20 or externally connected. The drive 111 writes/reads various kinds of data to/from a removable recording medium such as a magnetic disk, optical disk, magneto-optical disk, and semiconductor memory loaded into the information management server 20.

The connection port 112 is a port for connecting an external peripheral device and has a connection terminal such as the USB and IEEE1394. The connection port 112 is connected to the CPU 101 via the interface 107 and the external bus 106, the bridge 105, the host bus 104 or the like. The communication device 113 is a communication interface constituted by, for example, a communication device for connecting to the network 5. The communication device 113 transmits/receives various kinds of data to/from external devices such as the content viewing device 10 via the network 5.

If the content viewing device 10 is constituted by an information processing apparatus such as a personal computer, a configuration substantially the same as that of the information management server 20 can be adopted. If the content viewing device 10 is a TV set or the like, a known configuration can be adopted and therefore, a detailed description of the hardware configuration of the content viewing device 10 is omitted.

Next, the configuration of the content viewing device 10 according to the present embodiment will be described with reference to FIG. 3. FIG. 3 is a block diagram showing the configuration of the content viewing device 10 according to the present embodiment.

As shown in FIG. 3, the content viewing device 10 includes a content management unit 120, a content display control unit 130, a display unit 132, a level setting instruction unit 134, a viewing information generation unit 136, a recognition unit 138, an input unit 140, a viewing information transmitting unit 142, a viewing information receiving unit 144, a viewing information display control unit 146, and a superimposing unit 148.

The content management unit 120 manages viewing of content in the content viewing device 10. The content management unit 120 has, for example, a content acquisition unit 122, a content reproducing unit 124, and a viewing history management unit 126.

The content acquisition unit 122 has a function to acquire content from external devices. For example, the content acquisition unit 122 receives program content transmitted from the broadcasting device 7 via an antenna 127. At this point, the content acquisition unit 122 functions as a tuner of broadcast programs and tunes to a channel specified by the user to receive a program from the channel. Moreover, the content acquisition unit 122 receives delivered content transmitted from the content delivery server 9 via the network 5 and the communication device 113 (see FIG. 2). The content acquisition unit 122 also reads content stored in the removable recording medium 128 loaded into the content viewing device 10 using the drive 111 (not shown). Any recording medium such as a next-generation optical disk (a BLU-RAY disk and the like), DVD-R, DVD-RW, DVD-RAM, or an optical disk such as a magneto-optical disk, a memory card made of various kinds of semiconductor memory such as a flash memory can be used as the removable recording medium 128.

The content reproducing unit 124 has a function to reproduce content acquired from the external devices. The content reproducing unit 124 functions, for example, as a decoder for decoding content data. The content reproducing unit 124 outputs video data of content acquired by reproduction processing to the display unit 132 and audio data to a speaker (not shown).

The viewing history management unit 126 manages a history of viewing of content in the content viewing device 10. The history of viewing includes information of content viewed in the past, content being viewed at the present, and content planned to be viewed in the future (content set for viewing or recording in the future by the user). For example, the viewing history management unit 126 can acquire a history of viewing in the past and the present by managing a history of reproduction by the content reproducing unit 124 and also acquire planned viewing in the future by managing viewing settings or recording settings by the user. The viewing history management unit 126 stores such a history of viewing in a viewing history database (not shown). Moreover, the viewing history management unit 126 outputs a history of viewing of content in the content viewing device 10 to the viewing information generation unit 136.

The content display control unit 130 performs image processing for displaying content reproduced by the content reproducing unit 124 in the display unit 132. For example, the content display control unit 130 generates a display screen by reconstructing frames of video data of the reproduced content and adjusts the display position, size, display area and the like of video data of content in the screen of the display unit 132.

The display unit 132 is constituted by a display device and displays video of content input from the content display control unit 130 or viewing information of other users input from a viewing information display control unit 146 described later.

The level setting instruction unit 134 transmits, based on user input to the input unit 140, level setting instructions including shared level information (such as user correlation information, information disclosure level information, and information acquisition level information) of users of the content viewing device 10 to the information management server 20 to instruct level settings of such information. Details of the shared level information will be described later.

The viewing information generation unit 136 generates viewing information of content by users in the content viewing device 10. The viewing information generation unit 136 generates, based on, for example, a viewing history input from the content management unit 120, user input data to the input unit 140, or video/audio data on viewing space or users recognized by the recognition unit 138, viewing information of users of the content. The viewing information transmitting unit 142 transmits viewing information generated by the viewing information generation unit 136 to the information management server 20 via the network 5.

Here, viewing information will be described in detail. The viewing information is information representing viewed content in the content viewing device 10 (means "at least content viewed in the past by the user in the content viewing device 10, or content being viewed at the present, or content planned to be viewed in the future" and this also applies below) (see FIG. 11). Viewing information is naturally different from user to user of the content viewing device 10 and, preferences of each user of the content viewing device 10 can be known from such viewing information.

Viewing information according to the present embodiment includes, for example, (1) Information about viewed content in the content viewing device 10 (hereinafter, "viewed content information"), (2) Information representing the enthusiasm degree of the user for content viewing (hereinafter, "enthusiasm degree information"), (3) Viewing state information representing the viewing state of the user for content, and (4) Information representing on/off of power of the content viewing device 10.

Viewed content information in (1) includes identification information of viewed content (for example, the channel, content ID, and program name) in the content viewing device 10. Based on the viewed content information, content being viewed (or viewed in the past or planned to be viewed) by the user can be identified.

Enthusiasm degree information in (2) is, for example, information representing an impression of viewed content, information whether the viewing state of the user is "viewing while doing something else" or "riveted on the TV screen", or information representing feelings of the user. Methods of acquiring the enthusiasm degree information include, for example, input of text information (for example, "pleasant!" and "uninteresting") to the input unit 140 by the user, input of parameters (for example, the index of enthusiasm degree 0 to 100%), and selection input from choices representing the degree of enthusiasm displayed in the screen (for example, button selection from marks of "joy", "anger", "pity", and "pleasure"). Based on such enthusiasm degree information, it is possible to know preferences and feelings of other users and share content viewing with other users.

Viewing state information in (3) represents the viewing state of the user, for example, when, where, and with whom the user of the content viewing device 10 viewed what content for how long and in which way. Information about the viewing time of content such as the viewing start time and viewing duration can be acquired from the reproduction execution time and recording time of content currently being broadcast or content recorded in the past, and the time of content set to record in the future. Moreover, information such as presence of the user near the content viewing device 10, face recognition of the viewing user, voice recognition, and the number of viewers can be acquired by performing image processing/voice processing of image or video data obtained by using the recognition unit 138 (such as a camera, microphone, and sensor) provided in the content viewing device 10. Based on the viewing state information, the viewing state of other users can be known.

Based on information in (4) representing on/off of power of the content viewing device 10, whether any other user is viewing and presence of the user in the installation location (for example, the user's home) of the content viewing device 10 can be known.

In the foregoing, content of the viewing information according to the present embodiment has been described. The viewing information generation unit 136 in FIG. 3 generates viewing information (see FIG. 11) as described above and the viewing information transmitting unit 142 transmits the viewing information to the information management server 20 via the network 5. Such viewing information is transmitted to the information management server 20, for example, each time content is viewed or a recording setting or viewing setting is executed. However, the present invention is not limited to this example and viewing information may be transmitted periodically or at an optional time, for example, when the content viewing device 10 is turned on or a request is transmitted from the information management server 20.

The viewing information transmitting unit 142 receives viewing information of other users from the information management server 20 via the network 5. The viewing information of other users received here is information after being filtered appropriately from viewing information of many users. Details of the filtering processing will be described later.

The viewing information display control unit 146 performs image processing necessary for displaying viewing information of other users input from the viewing information transmitting unit 142 in the display unit 132. For example, the viewing information display control unit 146 converts the received viewing information of other users into user information representing the other users (for example, marks assigned to each user, icons, and face images) to display the user information or displays the received viewing information of other users in program guide form by associating with a program guide of content. Moreover, the viewing information display control unit 146 adjusts the display position, size, and display area of viewing information of other users in the screen of the display unit 132.

The superimposing unit 148 superimposes an image of information of other users output from the viewing information display control unit 146 on an image of video content output from the content display control unit 130 before displaying the superimposed image. Accordingly, information about other users viewing (or have viewed or planning to view) the content is displayed in the display unit 132 of the content viewing device 10 in parallel with video of content being reproduced. Thus, the user can know other users who view the same content as the user. A concrete example of the display screen in which viewing information of other users is superimposed will be described later.

The user can operate the content viewing device 10 not only through the input unit 104, but also by using the remote controller 3. For example, the user can dynamically adjust the shared level of viewing information of other users by operating the lever of the remote controller 3 while viewing content, but details thereof will be described later.

Figure 4:
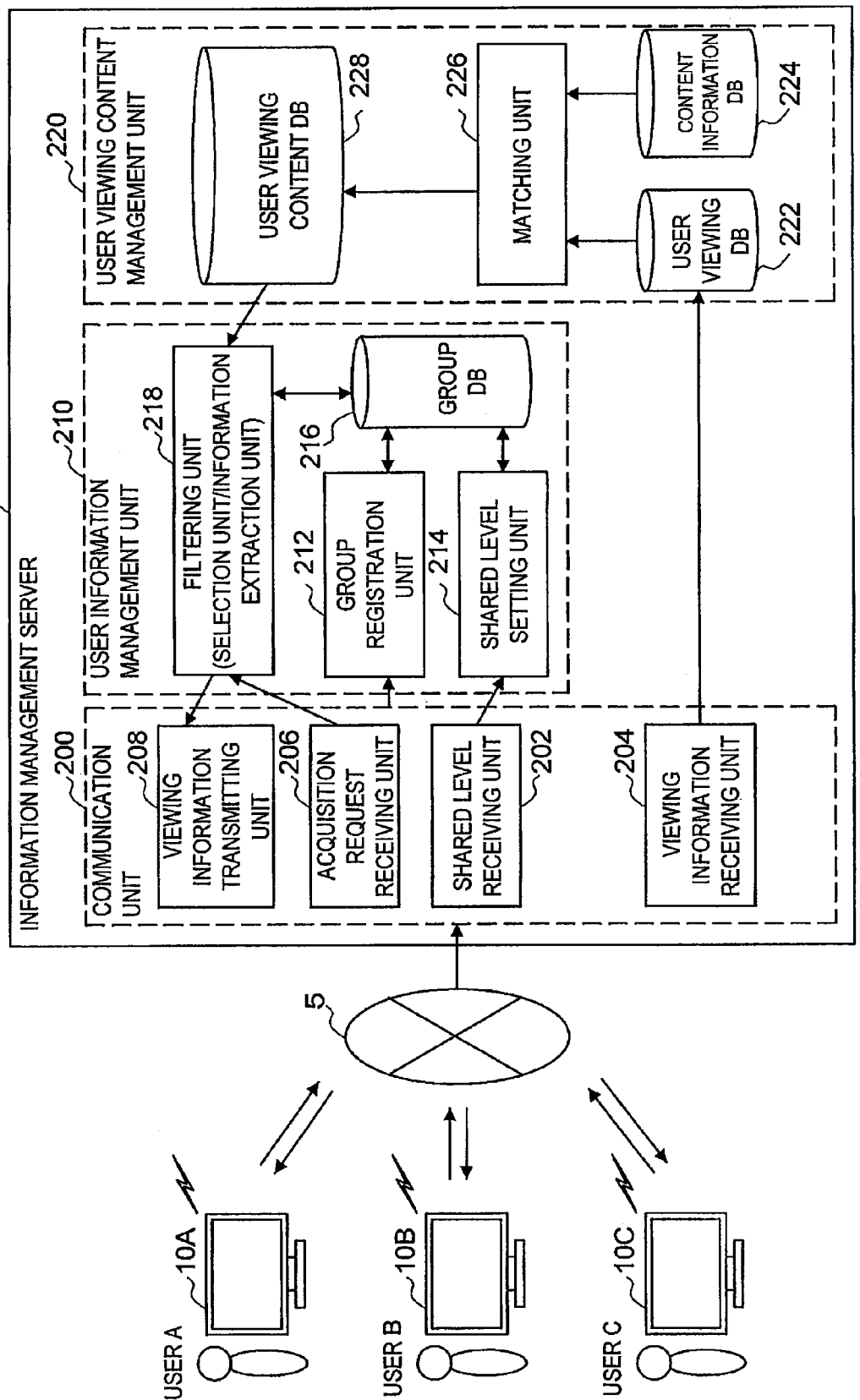
FIG. 4 is a block diagram showing the configuration of the information management server according to the first embodiment.

Next, the configuration of the information management server 20 according to the present embodiment will be described with reference to FIG. 4. FIG. 4 is a block diagram showing the configuration of the information management server 20 according to the present embodiment. In a description below, FIG. 8 to FIG. 18 will be referred to suitably to describe information handled by the information management server 20 and the configuration of a database.

As shown in FIG. 4, the information management server 20 roughly includes a communication unit 200 for performing data communication with the content viewing device 10 of each user via the network 5, a user information management unit 210 for managing shared level information of a plurality of users belonging to the same group, and a user viewing content management unit 220 for managing content viewing information of each user.

The communication unit 200 includes a shared level receiving unit 202 from the content viewing device 10 of each user, a viewing information receiving unit 204, an acquisition request receiving unit 206, and a viewing information transmitting unit 208. The shared level receiving unit 202 receives shared level information instructed by each user to set. The viewing information receiving unit 204 receives viewing information of each user from the content viewing device 10 of each user. The acquisition request receiving unit 206 receives a viewing information request, which is a command for requesting from the content viewing device 10 of some user acquisition of viewing information of other users. The viewing information transmitting unit 208 transmits viewing information of other users corresponding to each user concerned generated by a filtering unit 218 described later to the content viewing device 10 of each user.

The communication unit 200 includes a group registration unit 212, a shared level setting unit 214, a group database 216 (hereinafter, referred to as the "group DB 216"), and the filtering unit 218. The group registration unit 212 registers users of the content viewing device 10 as a group. The shared level setting unit 214 sets shared level information among users in the same group. The group DB 216 stores group information and shared level information. The filtering unit 218 filters viewing information to be provided to each of the content viewing devices 10. Each unit will be described in detail below.

The group registration unit 212 divides users of each of the content viewing devices 10 into specific groups/communities, which are registered with the group DB 216 as groups. The user groups can optionally be set, like groups, for example, in SNS (social networking service), in accordance with various user attributes (such as the age, sex, hobbies, preferences, place of residence, jobs, and friends). After receiving a group registration request from the user of the content viewing devices 10, the group registration unit 212 performs user authentication processing and then registers users by creating a new group or adding users to an existing group. A group is registered, as shown, for example, in FIG. 8, by registering a user ID of a user belonging to the group and group information in which the user and a user name are associated with the group DB 216. The group DB 216 is stored in the storage device 110 (see FIG. 2) of the information management server 20 or the like.

The shared level setting unit 214 sets, based on level setting instructions received from the content viewing device 10 of each user, shared level information among users belong to the same group. A level setting instruction is a command received by the shared level receiving unit 202 from each of the content viewing devices 10 and includes shared level information instructed by each user to set. Shared level information is information representing the shared level of viewing information among a plurality of users belonging to the same group. The shared level information includes user correlation information, information disclosure level information, and information acquisition level information.

Figure 5:
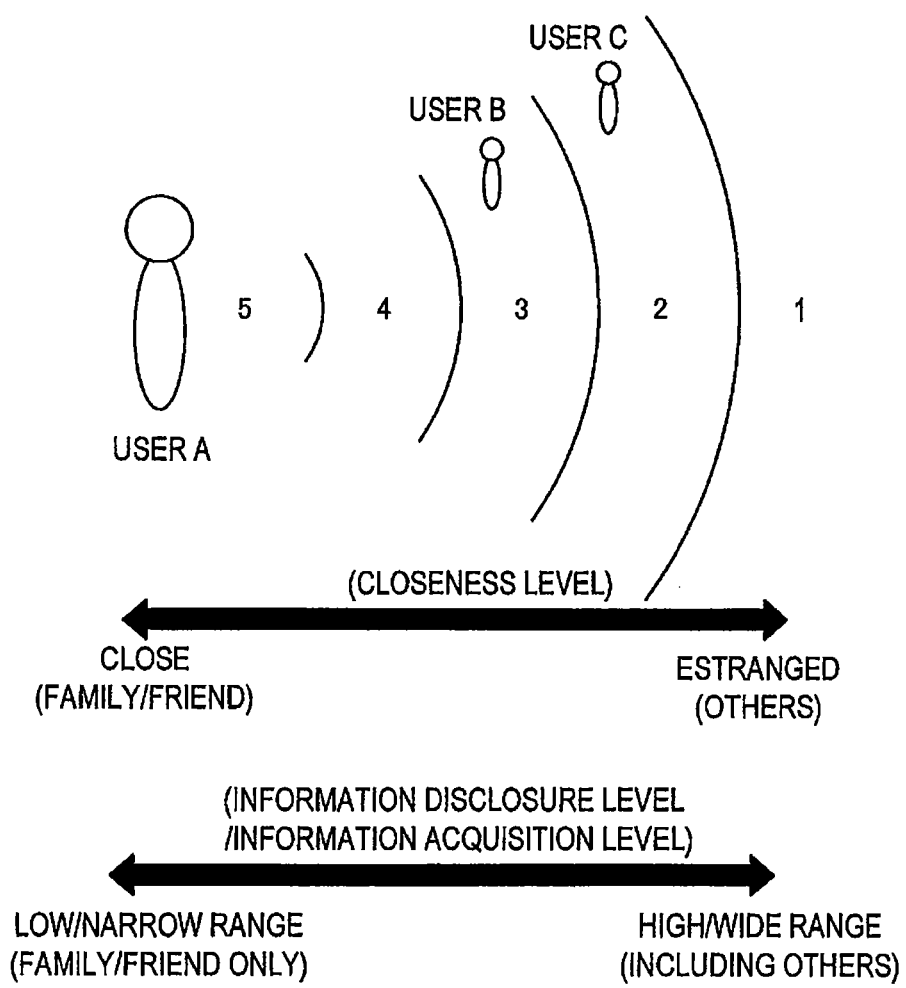
FIG. 5 is a conceptual diagram of user correlation information (closeness level) according to the first embodiment.

The user correlation information is information representing a closeness level among users belonging to the same group and is set to a level value in accordance with closeness among users. FIG. 5 is a conceptual diagram of user correlation information (closeness level). As shown in FIG. 5, the level value (closeness level value) of user correlation information is set, for example, on a scale of 1 to 5 and becomes larger as closeness among users increases. For example, the level value of user correlation information is set to "5" when the closeness level is high such as family members and friends, and the level value of user correlation information is set to "1" when the closeness level is low such as others.

The user A sets the level value of user correlation information as described above in accordance with closeness for each of other users B, C, . . . in the group. That is, the user A operates the content viewing device 10 to input the desired level value of user correlation information for each of other users B, C, . . . and instructs the setting. Then, setting instructions including user correlation information of the set level values are transmitted from the content viewing device 10 to the information management server 20 and the information management server 20 sets the received level values to the group DB 216 as user correlation information of the user A (see FIG. 9).

FIG. 9 shows a concrete example of user correlation information (closeness level information). As shown in FIG. 9, level values of each of the three users A, B, and C with respect to other users are set. As for the user A, the closeness level value of the user B of the user ID "0002" is set to "3", showing that closeness between the user A and the user B is a middle level (such as ordinary acquaintances). Also, the closeness level value of the user C of the user ID "0003" is set to "2", showing that closeness between the user A and the user C is a little estranged (such as company colleagues). Further, the closeness level value of the user D of the user ID "0004" is set to "5", showing that closeness between the user A and the user D is the closest (such as family members or friends).

Such level values of user correlation information function as the reference when viewing information of other users is filtered based on information disclosure level information and information acquisition level information described later. Therefore, such user correlation information is statically set by each user in advance and the level value thereof can suitably be changed, but should not be dynamically changed while content is being viewed.

Next, the information disclosure level information and information acquisition level information will be described. The information disclosure level information is information showing the range (for example, the closeness level) of other users to whom some user permits his (her) viewing information to be disclosed. The information acquisition level information is information showing the range (for example, the closeness level) of other users from whom some user acquires viewing information.

Like the user correlation information (closeness level), the information disclosure level information and information acquisition level information are set to level values in accordance with the user-desired information disclosure level or information acquisition level. For example, in the above example in FIG. 5, the level value of information disclosure level information and that of information acquisition level information (hereinafter, called the "information disclosure level value" and "information acquisition level value" respectively) are set on a scale of 1 to 5 (1, 2, 3, 4, and 5). Then, users for whom the level value (closeness level value) of the user correlation information is set higher than the information disclosure level value/information acquisition level value are included in the range of users for information disclosure/information acquisition.

In the example in FIG. 5, for example, closeness levels of the users B and C to the user A are "3" and "2" respectively. If, in this case, the information disclosure level value/information acquisition level value set by the user A is "3", while the user B is included for information disclosure/information acquisition (the closeness level value "3"$\geq$ the information disclosure/information acquisition level value "3"), the user C is not included (the closeness level value "2"< the information disclosure/information acquisition level value "3"). If the information disclosure level value/information acquisition level value set by the user A is "1", the user B and user C are included for information disclosure/information acquisition (the closeness level values "3", "2"$\geq$ the information disclosure/information acquisition level value "1").

Like the user correlation information (closeness level), such information disclosure level information and information acquisition level information are also set in accordance with user input to the content viewing device 10. That is, the user A operates the content viewing device 10 to input the information disclosure level values/information acquisition level values with respect to the other users B, C, . . . and instructs the settings. Then, setting instructions including the set information disclosure level values/information acquisition level values are transmitted from the content viewing device 10 to the information management server 20 and the information management server 20 sets the received level values in the group DB 216 as information disclosure level information/information acquisition level information of the user A (see FIG. 10).

FIG. 10 shows a concrete example of information disclosure level information and information acquisition level information. As shown in FIG. 10, the information disclosure level value/information acquisition level value with respect to other users are set for each of the three users A, B, and C by associating with the user ID. As for the user A, for example, the information disclosure level value is set to "3" and the information acquisition level value is also set to "3". This shows that, among users in the group, the user A permits disclosure of his (her) viewing information to other users with whom closeness is a middle level (such as ordinary acquaintances) and desires acquisition of viewing information of such other users.

By setting the information disclosure level value and the information acquisition level value to the same level value like this, viewing information can be shared on an equal footing with a partner. If the levels values are set like "the information disclosure level value>the information acquisition level value", the range of acquisition of viewing information can be made wider than that of disclosure. Conversely, if the levels values are set like "the information disclosure level value<the information acquisition level value", the range of disclosure of viewing information can be made wider than that of acquisition. The user can, as described above, freely set the information disclosure level value and the information acquisition level value in accordance with relations with other users in the group and the range of users with whom sharing (disclosure/acquisition) of viewing information is desired.

In contrast to the level value of user correlation information, the information disclosure level value/information acquisition level value can freely be set at any time in accordance with a desire of the user. Thus, the information disclosure level value/information acquisition level value can dynamically be set and changed when, for example, the user is viewing content using the content viewing device 10. The range of viewing information of other users displayed in the content viewing device 10 can also be dynamically changed by such dynamic setting changes.

The shared level setting unit 214 sets, as described above, the information disclosure levels and information acquisition levels among users belong to a group to the group DB 216 based on level setting instructions from the content viewing device 10 of each user.

Next, the filtering unit 218 will be described. After performing filtering processing based on shared level information among users set in the group DB 216, as described above, the filtering unit 218 extracts, in response to a request from each user, viewing information of other users linked to content being viewed from a user viewing content database 228 of the user viewing content management unit 220 described later and provides the viewing information to the content viewing device 10 of each user.

The filtering unit 218 is an example of a selection unit and an information extraction unit of the present invention. The selection unit has a function, in response to a viewing information request of other users received from the content viewing device 10, to select other users fitting conditions of shared level information (user correlation information, information disclosure level information, and information acquisition level information) set in the group DB 216 from among other users belonging to the same group as the user of the content viewing device that made the request. The information extraction unit has a function to extract viewing information of the other users selected by the selection unit.

The filtering unit 218 performs filtering processing of viewing information of other users to be provided to each of the content viewing devices 10 based on the information disclosure levels and information acquisition levels set by each user. Accordingly, privacy can be managed by limiting other users whose viewing information should be disclosed in accordance with user settings and also the range of other users from whom acquisition of viewing information is desired by a user can be adjusted. Details of such filtering processing will be described later (see FIG. 21).

Next, the user viewing content management unit 220 shown in FIG. 4 will be described. The user viewing content management unit 220 includes a user viewing database 222 (hereinafter, called the "user viewing DB 222"), a content information database 224, (hereinafter, called the "content information DB 224"), a matching unit 226, and a user viewing content database 228 (hereinafter, called the "user viewing content DB 228"). The user viewing DB 222, the content information DB 224, and the user viewing content DB 228 are stored in the storage device 110 (see FIG. 2) of the information management server 20 or the like. Each unit will be described in detail below.

The user viewing content management unit 220 collects viewing information of content of each user from each of the content viewing devices 10 and stores the viewing information in the user viewing DB 222. In this manner, viewing information of each user received by the viewing information receiving unit 204 from each of the content viewing devices 10 is first stored in the user viewing DB 222. A concrete example of the viewing information will be described below.

FIG. 11 shows a concrete example of viewing information of the user A transmitted from the content viewing device 10 to the information management server 20. As shown in FIG. 11, when program content of TV broadcasting or VOD content is viewed in the content viewing device 10, viewing information is generated by the content viewing device 10 and transmitted to the information management server 20. The viewing information includes, for example, the media providing viewed content, channel, content ID, viewing start time, viewing duration, and planned viewing of content in the future (viewing setting, recording setting or the like). Viewed content of a user can be identified from the content ID, which is identification information of content, viewing setting, and media, channel, and viewing start time, which are content attribute information. The viewing state of content can be known from the viewing duration or the like.

The user viewing content management unit 220 analyzes viewing information transmitted from the plurality of content viewing devices 10 and stores the viewing information in the user viewing DB 222 by classifying the viewing information by user. At this point, the user ID of the content viewing device 10 that transmitted the viewing information, viewing ID, and viewing attributes are added to the viewing information.

FIG. 12 shows a concrete example of viewing information of the user A stored in the user viewing DB 222. As shown in FIG. 12, information about viewed content (for example, the viewing ID, viewing date/time, content identification information, and viewing attributes) of the user A is arranged, for example, chronologically in the user viewing DB 222. "Viewing ID" is an ID uniquely attached each time content is viewed by the user A. "Viewing date/time" is a date/time when viewed content was viewed. "Content identification information" includes the channel and content ID in the example, but in addition, the G code used for a recording setting may also be used. If only the content ID is used as identification information of content, it is necessary for the content ID alone to be able to uniquely identify content. Otherwise, the content ID and the viewing date/time may be combined.

"Viewing attributes" are attribute information for classifying viewed content in accordance with the viewing date/time. In the "viewing attributes", "past history" shows that the user A viewed content broadcast in the past, "present state" shows that the user A is currently viewing content currently being broadcast, and "planned viewing" shows that the user A has made a recording setting or viewing setting of content to be broadcast in the future and plans to view the content.

Information about viewed content as shown above is stored in the user viewing DB 222 for each user in the group. Though the above enthusiasm degree information and viewing state information are not shown in the example in FIG. 12, if such information is contained in the viewing information, the information is stored in the user viewing DB 222.

Next, the content information DB 224 will be described. The content information DB 224 stores information about a plurality of pieces of content that can be provided from a content providing device (such as the broadcasting device 7 and the content delivery server 9 in FIG. 1) to each of the content viewing devices 10, for example, a program guide of content of TV broadcasting. For example, the content information DB 224 is a database created as a metadata database suited to the system by adding meta information and attribute information about content to an electronic program guide (EPG) of TV broadcasting. The user viewing content management unit 220 of the information management server 20 acquires a program guide from an external program guide providing device (for example, an EPG provider) or the like via the network 5 or the like and adds predetermined meta information and attribute information necessary for use in the content sharing system 1 to the program guide before storing the program guide in the content information DB 224.

FIG. 13 shows a concrete example of the program guide stored in the content information DB 224. As shown in FIG. 13, the content information DB 224 stores a plurality of program guides that can be provided to each of the content viewing devices 10 (that is, a plurality of pieces of content that can be viewed in each of the content viewing devices 10). The program guide is chronological information of content IDs in each channel. In the program guide of the example shown in FIG. 13, the provision date/time (such as the broadcasting date/time and delivery date/time) of content to the content viewing device 10, content ID of program content of a predetermined broadcasting channel broadcast from the broadcasting device 7, and content ID of program content of a predetermined delivery channel delivered from the content delivery server 9 are associated. The program guide shows that, for example, in the 12:00 time zone, program content whose content ID is "03" is broadcast in the broadcasting channel and program content whose content ID is "13" is delivered in the delivery channel.

Next, the matching unit 226 in FIG. 4 will be described. The matching unit 226 constructs the user viewing content DB 228 by matching the user viewing DB 222 and the content information DB 224. The user viewing content DB 228 is a database associating content IDs of a plurality of pieces of content (content of the program guide) that can be provided to each of the content viewing devices 10 and user IDs (viewing user information) of users viewing the content (see FIG. 14) and represents viewed content of each user in the same group.

Figure 6:
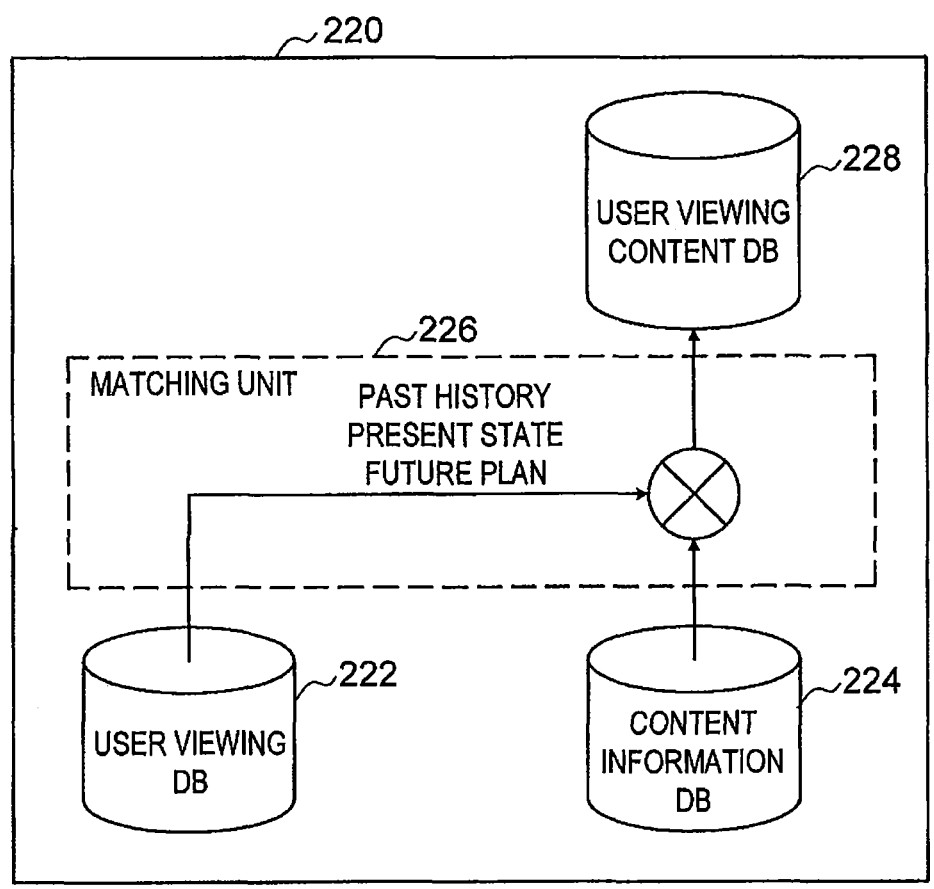
FIG. 6 is a block diagram showing a user viewing content management unit according to the first embodiment.

The matching unit 226 will be further described with reference to FIG. 6. As shown in FIG. 6, the matching unit 226 checks identification information (content ID) of content contained in a program guide read from the content information DB 224 against identification information (such as the content ID, channel, and viewing time) of viewed content of each user read from the user viewing DB 222 to associate each piece of content contained in the program guide with user IDs of users viewing the relevant content. Accordingly, the user viewing content DB 228 is created in which information obtained by sorting viewing information of a plurality of users in the group according to content in the program guide is stored (see FIG. 14). In the present embodiment, all viewed content whose viewing state is "past history", "present state", or "planned viewing" as described above is associated with content of the program guide, which is chronological information, by such matching processing.

FIG. 14 shows a concrete example of the user viewing content DB 228. As shown in FIG. 14, the provision date/time of content, content ID of content of each broadcasting channel broadcast to the content viewing device 10, and viewing user information (user ID) representing users who viewed content are associated. For example, the user ID of the user A is associated with content of the content ID "01" broadcast in the past, showing that only the user A and user C of the users A, B, C, . . . in the group viewed the content. Similarly, the user IDs of the users A, B, and C are associated with content of content ID "03" currently being broadcast, showing that the users A, B, and C are currently viewing the content. No user ID of users is associated with content of content ID "02" broadcast in the past, showing that no user in the group viewed the content. The user ID of the user D and a viewing probability thereof of 80% are associated with content of content ID "04" to be broadcast in the future. A predetermined value "80%" may normally be assigned to the viewing probability when a planned recording is made or the viewing probability may be calculated based on a past viewing history of the user or viewing probabilities of content of other planned recordings.

The user viewing content management unit 220 generates the user viewing content DB 228, as described above, and updates the user viewing content DB 228 by adding/deleting/changing viewing user information each time new viewing information is received from the content viewing device 10. With the user viewing content DB 228 being managed by the user viewing content management unit 220 in this manner, the information management server 20 can normally maintain a content program guide associated with the latest viewing user information.

Next, the filtering unit 218 of the user information management unit 210 will be described again in detail. The filtering unit 218 performs filtering processing of viewing user information contained in the user viewing content DB 228 based on shared level information set in the group DB 216.

More specifically, when a viewing information request that requests acquisition of viewing information of other users from the content viewing device 10, the filtering unit 218 first identifies the user A of the content viewing device 10 making the request and reads shared level information containing settings of the group to which the requesting user A belongs from the group DB 216. Next, the filtering unit 218 selects the other users B to D of levels set by the user A for acquisition of viewing information from among other users B to Z in the group based on user correlation information (closeness level value) contained in the shared level information of the group and the information acquisition level value of the user A (first filtering processing). Further, the filtering unit 218 selects the other user B who sets the user A for disclosure of viewing information from the selected other users B to D based on the user correlation information (closeness level value) and the information disclosure level value of the selected other users B to D (second filtering processing).

Then, the filtering unit 218 extracts viewing information (such as viewing user information, content ID, date/time and the like) of the other user B selected from the other users B to D in the group from the user viewing content DB 228 and transmits the viewing information to the content viewing device 10 of the requesting user A.

FIG. 15 shows the user viewing content DB 228 filtered for the user A. In the user viewing content DB 228, as shown in FIG. 15, viewing user information of the user C excluded by the above filtering processing from viewing user information of the users A to D associated with content is deleted. Then, information associating viewing user information (user ID) of the users B and D excluding the user C, content IDs, and dates/times is transmitted as viewing information of other users to the content viewing device 10 of the user A from the user viewing content DB 228. The user A can thereby acquire viewing information of the other users B and D who set the user A for information disclosure from the other users B to D in the range of users set by the user A for information acquisition. Accordingly, viewing information of users of closeness desired by the user A can be provided to the user A while protecting privacy of the users B to Z in the group.

In the information management server 20 according to the present embodiment, as described above, shared level information is set in the information management server 20 and, based on the shared level information, viewing information of users against each of the content viewing devices 10 will be filtered out. Accordingly, privacy of users in the group can be managed and also the range of information acquisition can be adjusted in accordance with preferences of users.

Figure 7:
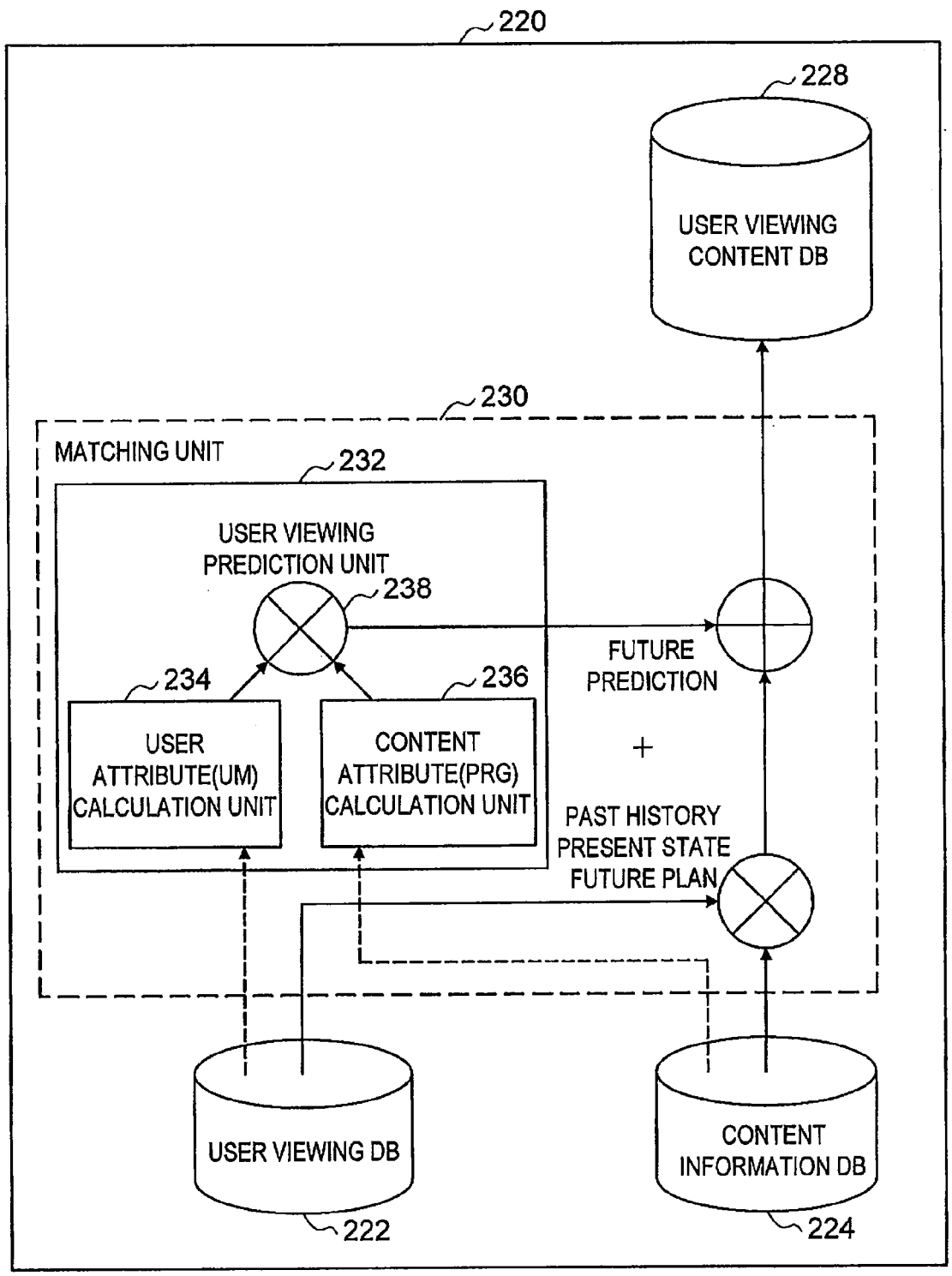
FIG. 7 is a block diagram showing the user viewing content management unit according to a modification of the first embodiment.

Next, a modification of the matching unit of the information management server 20 according to the present embodiment will be described with reference to FIGS. 16 to 18. FIG. 7 is a block diagram showing the configuration of the matching unit for making a future prediction according to a modification of the present embodiment, and FIGS. 16 to 18 are explanatory diagrams showing the configuration of a database as a result of making a future prediction according to the modification of the present embodiment.

The matching unit 226 of the user viewing content management unit 220 generates the user viewing content DB 228 containing viewing user information whose viewing attribute is "past history", "present state", or "planned viewing" (see FIG. 15). In contrast, a matching unit 230 according to the modification generates, in addition to "past history", "present state", and "planned viewing", viewing user information whose viewing attribute is "future prediction" and adds this information to the user viewing content DB 228 as viewing user information. The viewing attribute "future prediction" indicates that there is a possibility that a user will view content to be broadcast in the future. "Future prediction" will be described below in detail.

The matching unit 230 generates future prediction information (for example, the probability 0 to 100%) of a user following a predetermined estimation algorithm based on a viewing history and preferences of the user. More concretely, the matching unit 230 analyzes viewing setting/recording setting information obtained from the content viewing device 10 of the user and viewing history information stored in the information management server 20 to calculate the probability that the user will view content planned to be broadcast in the future. If, for example, a broadcast program is serial content such as a drama, whether the user will view the content next time can be known to some degree by analyzing the viewing history of the serial content broadcast in the past or whether viewing is set for the content next time. Even if content is not a serial, viewing trends and preferences of the user can be judged by analyzing attribute information of content viewed by the user in the past so that the probability of viewing similar content can be calculated.

Thus, the matching unit 230 shown in FIG. 7 calculates the probability that a user will view a plurality of pieces of future content contained in a program guide used a predetermined estimation algorithm based on viewing information of the user to make a future prediction. Here, for example, an estimation algorithm using the formula (1) below can be used as the predetermined estimation algorithm. An outline thereof will be provided below. The Formula (1) is a formula for determining a viewing probability (UM, PRG).

[Formula 1]

$$\text{Viewing probability}(UM, PRG) = \frac{\sum_i (UM(i) \times PRG(i))}{\sqrt{\sum_i UM(i)^2} \times \sqrt{\sum_i PRG(i)^2}} \quad (1)$$

In the Formula (1), "UM" is a user model vector and "PRG" is a program vector.

The program vector (PRG) is a vector representing characteristics of content (program) and is determined by data mining of content metadata. For example, the genre, performers, and keywords extracted from comments of content become components of a content vector.

The user model vector (UM) is a vector representing preferences of a user and is determined by learning processing (for example, when recording processing of some program is performed, content (such as performers and keywords) contained in the program vector is added to the user model vector (UM)) based on an operation log such as content viewing behavior of the user and initial input of the user (for example, added to the user model vector (UM) based on favorite genres and show-business personalities).

The user model vector (UM) and program vector (PRG) are calculated by applying the Formula (1) to calculate the degree of preferences of the user for the program and by normalizing the degree of preferences for all pieces of content, the future prediction (UM, PRG) of each piece of content can be calculated.

To perform the above estimation algorithm, in addition to the configuration in FIG. 6, the matching unit 230 shown in FIG. 7 further has a user viewing prediction unit 232. The user viewing prediction unit 232 predicts content each user may view based on viewing information of each user received from each of the content viewing devices 10 and attribute information of content contained in a program guide in the content information DB 224 and calculates viewing probabilities thereof. In program content contained in a program guide, attribute information such as the category of program, characters, genre, ages for viewing, and degree of variety is determined in advance on a program content basis. The user viewing prediction unit 232 makes a future prediction of a user after matching of attribute information of the program content and preference information of the user for all pieces of content.

The user viewing prediction unit 232 includes a user attribute UM calculation unit 234, a content attribute PRG calculation unit 236, and a user viewing probability calculation unit 238.

The user attribute UM calculation unit 234 calculates a user model vector (UM) representing preferences of the user by leaning processing based on viewing information of each user read from the user viewing DB 222 or initial input of the user. Based on attribute information of content contained in a program guide read from the content information DB 224, the content attribute PRG calculation unit 236 calculates a program vector (PRG) representing characteristics of content (program). The user viewing probability calculation unit 238 calculates viewing probabilities (UM, PRG) of the user for each of a plurality of pieces of future content contained in the program guide by applying the calculated user model vector (UM) and program vector (PRG) to the formula (1). The predetermined estimation algorithm is not limited to the above example and, for example, an estimation algorithm described in Japanese Patent Application Laid-Open No. 2005-57713, which is incorporated herein by reference in its entirety, may be used.

Using the estimation algorithm described above, the matching unit 230 predicts content that each user may view from content contained in a program guide and also can calculate viewing probabilities of such content. The matching unit 230 adds the future-predicted viewing information of the user to viewing information of each user in the user viewing DB 222.

For example, the user viewing DB 222 shown in FIG. 16 has, as a future prediction of the user A for content in the future, a future prediction associating the viewing ID "777", content ID "1112233", viewing date/time "March 11, 09:00", and viewing attribute "future prediction (80%)" added thereto.

The matching unit 230 also generates the user viewing content DB 228 associating future content contained in a program guide in the content information DB 224 and information about viewing probabilities predicted by the user viewing prediction unit 232.

More concretely, like the matching unit 226 in FIG. 6, the matching unit 230 performs matching processing of the user viewing DB 222 and the content information DB 224 to construct the user viewing content DB 228 containing viewing user information of "past history", "present state", and "future plan". Further, the matching unit 230 adds viewing user information viewing-predicted by the user viewing prediction unit 232 to the user viewing content DB 228. For example, in the user viewing content DB 228 shown in FIG. 17, viewing user information of the user A (user ID of the user A and the viewing probability of 100%) and viewing user information of the user B (user ID of the user B and the viewing probability of 40%) are added to future content having the content ID "05" as viewing information of "future prediction" obtained from a future prediction. This means that the user A will view content of the content ID "05" with the viewing probability of 100% and the user B will view the content with the viewing probability of 40%.

The user viewing content DB 228 containing future-predicted viewing user information is filtered in this manner by the filtering unit 218. Other users satisfying conditions of the shared level information are selected by the filtering processing and viewing information of the selected other users is extracted before being provided to the content viewing device 10.

FIG. 15 shows the user viewing content DB 228 (including a future prediction) after being filtered for the user A. As shown in FIG. 18, the user viewing content DB 228 contains, in addition to the viewing user information of "past history", "present state", and "future plan" shown in FIG. 15, viewing user information of "future prediction". The content viewing device 10 of the user A can present future prediction information of other users to the user A by receiving information of the user viewing content DB 228 after the filtering.

In the foregoing, the configuration of the information management server 20 according to the present embodiment and configuration examples of various kinds of information handled by the information management server 20 have been described with reference to FIGS. 4 to 18.

Figure 19:
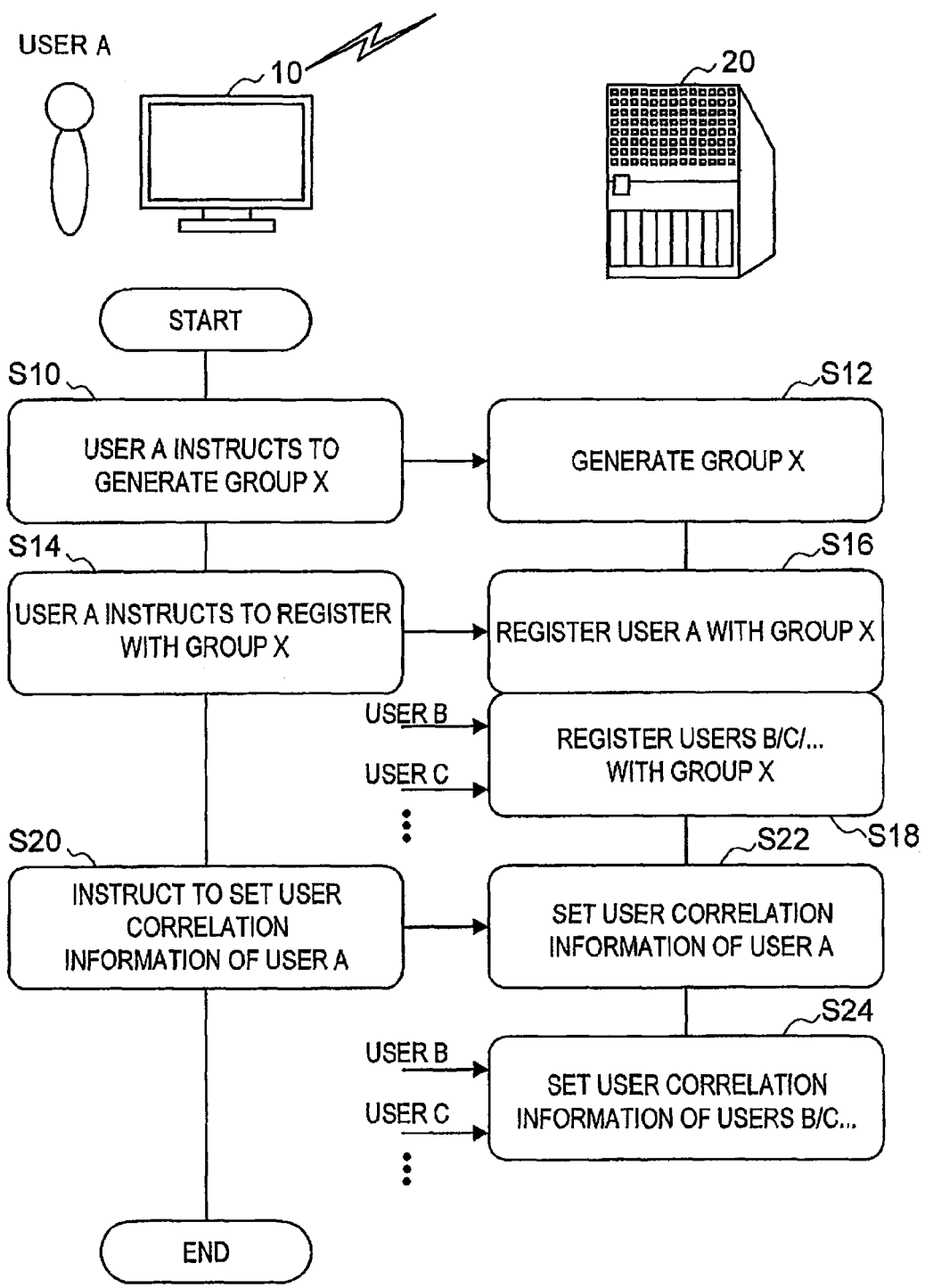
FIG. 19 is a flow chart showing environment setting processing in the information sharing system according to the first embodiment.

Next, environment setting processing in the information sharing system 1 according to the present embodiment will be described with reference to FIG. 19. FIG. 19 is a flow chart showing environment setting processing (group registration and user correlation information setting processing) in the information sharing system 1 according to the present embodiment.

As shown in FIG. 19, the content viewing device 10 of the user A first transmits, based on input of the user A, a generation instruction of a new group X to the information management server 20 (step S10). In response to the instruction, the information management server 20 generates the new group X and registers the group X with the group DB 216 (step S12).

Next, based on input of the user A, the content viewing device 10 transmits a registration instruction of the user A with the group X to the information management server 20 (step S14). In response to the instruction, the information management server 20 registers the user A with the group X (step S16). More concretely, the information management server 20 registers the user ID and user name of the user A as group information of the group X of the group DB 216 (see FIG. 8). Similarly, other users B, C, . . . are registered with the group X (step S18).

Further, the user A sets user correlation information (closeness level value) to the users B and C belong to the group X (steps S20, S22). That is, the content viewing device 10 of the user A transmits, based on input of the user A, a setting instruction containing user correlation information (closeness level value) between the user A and users B, C, . . . to the information management server 20 (step S20). In response to the instruction, the information management server 20 sets the user correlation information of the user A to the group DB 216 (step S22). More concretely, the information management server 20 sets the closeness level values of the user A to the users B, C, . . . as user correlation information of the user A in the group DB 216 (see FIG. 9). Similarly, the other users B, C, . . . set user correlation information to other users in the group X (step S24). Such user correlation information settings are basically made statically before viewing information being shared in the content viewing device 10.

With the above processing, a group DB is constructed in the information management server 20 and environment settings for sharing viewing information among a plurality of users A, B, C, . . . belonging to the same group X are completed.

Figure 20:
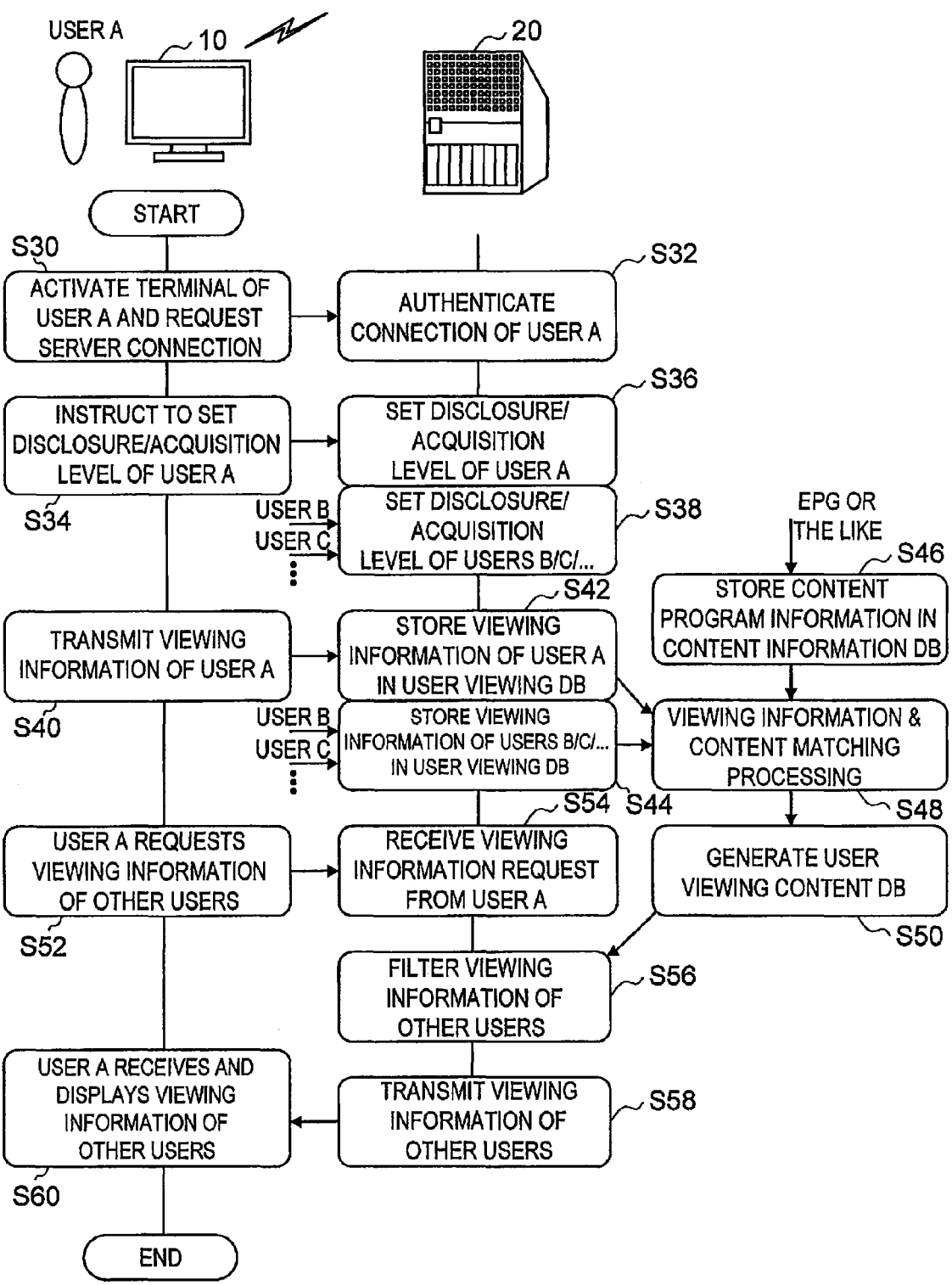
FIG. 20 is a flow chart showing a viewing information sharing method in the information sharing system according to the first embodiment.

Next, a method of sharing viewing information in the information sharing system 1 according to the present embodiment will be described with reference to FIG. 20. FIG. 20 is a flow chart showing the method of sharing viewing information in the information sharing system 1 according to the present embodiment.

As shown in FIG. 20, the user A first activates the content viewing device 10 and requests connection to the information management server 20 (step S30). In response to the request, the information management server 20 authenticates the user A and permits connection of the content viewing device 10 of the user A (step S32). Then, the user A uses the content viewing device 10 to view content of the desired channel.

Next, the user A sets, at an optional time of viewing the content, information disclosure level information and information acquisition level information with respect to other users (steps S34 and S36). More specifically, the content viewing device 10 of the user A transmits, based on user input, information disclosure level information and information acquisition level information of the user A with respect to other users to the information management server 20 to instruct to set the information (step S34). In response to the setting instruction, the information management server 20 sets the information disclosure level information and information acquisition level information received from the content viewing device 10 of the user A to the group DB 216 (step S36). More concretely, the information management server 20 sets the information disclosure level values and information acquisition level values of the user A with respect to other users in the group X in the group DB 216 as the information disclosure level information and information acquisition level information of the user A (see FIG. 10). Similarly, the other users B, C, . . . also set the information disclosure level values and information acquisition level values with respect to other users in the group X (step S38). The above setting of information disclosure level information and information acquisition level information can dynamically be adjusted while content is being viewed in the content viewing device 10.

Then, the content viewing device 10 transmits viewing information (for example, viewed content information such as the viewed channel, viewing location, and content ID, viewing state information, and enthusiasm degree information) of the user A to the information management server 20 while content is being viewed in the content viewing device 10 (step S40). The information management server 20 stores the viewing information received from the content viewing device 10 of the user A in the user viewing DB 222 (step S42).

The viewing information may contain not only information about content currently being viewed by the user A, but also information about content viewed in the past or content planned to be viewed in the future. The content viewing device 10 may transmit viewing information of the user A periodically or when the viewed content is switched. Transmitted viewing information is handled securely by the user viewing content management unit 220 of the information management server 20 while privacy is being managed. However, it is also possible for the content viewing device 10 of the user A not to transmit part or all of viewing information to the information management server 20 in accordance with the information disclosure level of the user A set at step S34 or S36.

Similarly, the content viewing devices 10 of the users B, C, . . . transmit viewing information of the users B, C, . . . to the information management server 20 and the information management server 20 stores the viewing information in the user viewing DB 222 (step S44). By repeating S40 to S44, the information management server 20 collects viewing information of each user from each of the content viewing devices 10 and accumulates the viewing information in the user viewing DB 222 (see FIG. 12).

While collecting viewing information in this manner, the information management server 20 constructs the content information DB 224 based on a program guide such as EPG acquired from outside (step S46). More specifically, the user viewing content management unit 220 of the information management server 20 collects and analyzes metadata (for example, the broadcasting time, program ID, and content ID of packaged media) and attribute information (for example, performers, the genre, and related content) of various kinds of content such as video/audio content of broadcasts, packaged media, and delivery media and game content. Accordingly, the information management server 20 generates program information of content suited to the information sharing system 1 and stores the program information in the content information DB 224 (see FIG. 13).

Next, the information management server 20 performs matching processing of viewing information of each user stored in the user viewing DB 222 after being acquired from each of the content viewing devices 10 and content program information (program guide) stored in the content information DB 224 to construct the user viewing content DB 228 (step S50). The user viewing content DB 228 is information in which content contained in the content program information and viewing user information of the content are associated (see FIGS. 14 and 17). In the user viewing content DB 228, viewing user information of users in the group X is sorted according to content in a program guide chronologically and shows which user viewed which content.

Next, based on input of the user A, the content viewing device 10 of the user A transmits a viewing information request of other users (step S52) and the information management server 20 receives the viewing information request of other users (step S54). In response to the viewing information request from the content viewing device 10, the information management server 20 performs privacy management in accordance with the shared level setting among users in the group X to perform optimal filtering processing and then, extracts viewing information of other users in the group X from the user viewing content DB 228 (step S56) before transmitting the viewing information to the content viewing device 10 of the user A (step S58). Details of the filtering processing will be described later (see FIG. 21).

As a result, the content viewing device 10 of the user A receives viewing information of other users from the information management server 20 and displays the viewing information of other users in parallel with reproduced video of content being viewed (step S60). Accordingly, while viewing content, the user A can know information about other users B, C, . . . in the group X viewing the content. At this point, by performing filtering processing in accordance with settings of the information disclosure level and information acquisition level among users, the shared level of viewing information can be adjusted even among users in the same group.

Figure 21:
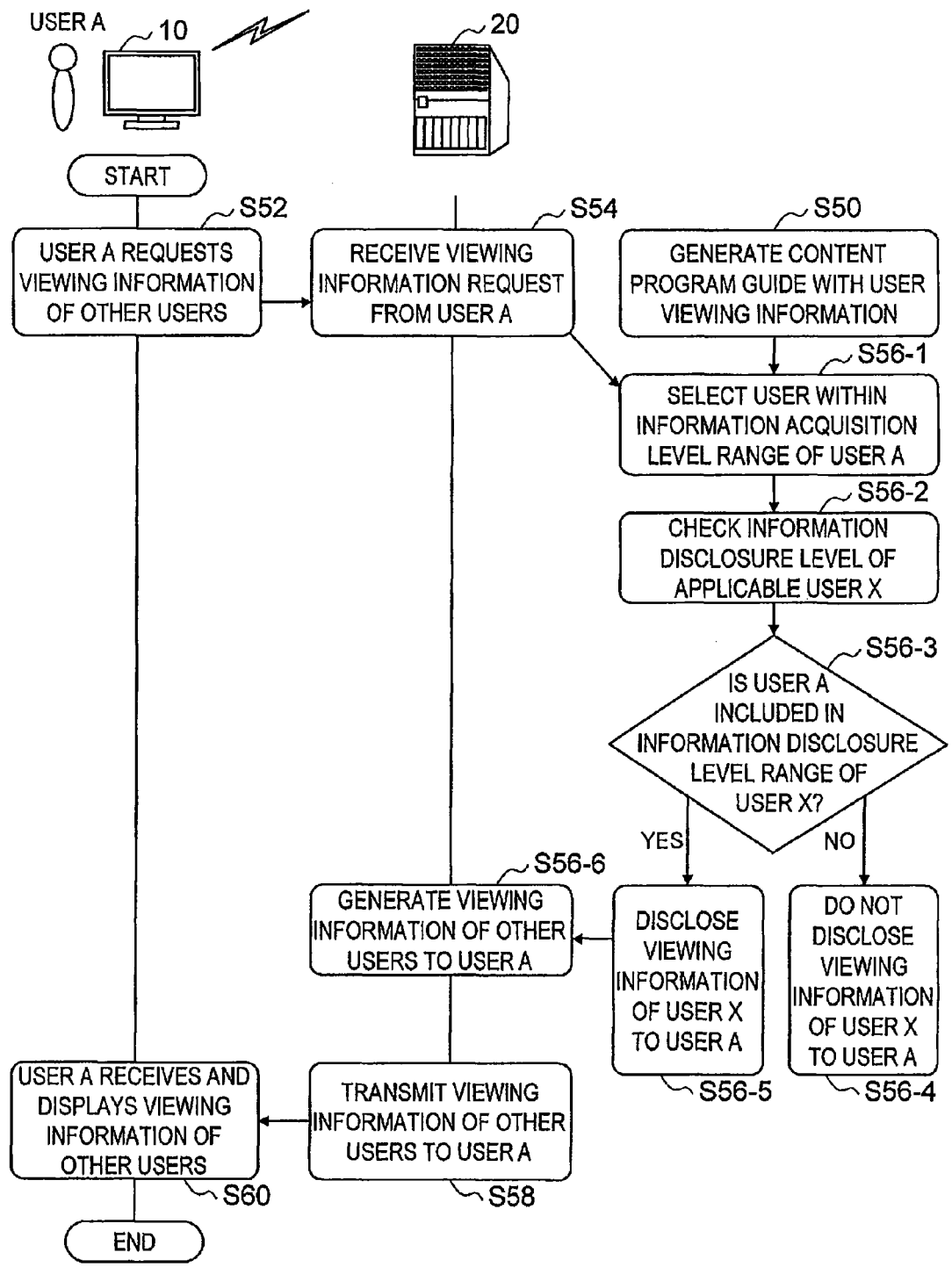
FIG. 21 is a flow chart showing filtering processing in the information sharing system according to the first embodiment.

Next, filtering processing of viewing information in the information sharing system 1 according to the present embodiment will be described with reference to FIG. 21. FIG. 21 is a flow chart showing filtering processing in the information sharing system 1 according to the present embodiment. Processing in FIG. 21 corresponds to S50 to S60 in FIG. 20.

As shown in FIG. 21, the information management server 20 generates the user viewing content DB 228 in advance based on viewing information received from each of the content viewing devices 10 (step S50). The user viewing content DB 228 is created, as described above, by adding viewing user information sorted according to content to program information of content and is constructed as a content program guide with user viewing information.

If, in this state, the content viewing device 10 of the user A transmits a viewing information request of other users (step S52) and the information management server 20 receives the viewing information request from the requesting content viewing device 10 (step S54), the information management server 20 performs filtering processing S56-1 to S56-6 shown below (corresponding to S56 in FIG. 20).

The information management server 20 first selects, based on the group DB 216, one or two or more users X within the range of the information request level of the user A (step S56-1). More specifically, the information management server 20 first refers to group information of the group DB 216 to identify users belonging to the same group as the user A. Next, the information management server 20 reads information acquisition level information (information acquisition level value) of the user A and user correlation function (closeness level value) about the user A set in the group DB 216 to compare the closeness level value of the user A with respect to each user with the information acquisition level value of the user A. In accordance with a comparison result thereof, the information management server 20 selects users X whose closeness level value is equal to or greater than the information acquisition level value of the user A (see FIG. 5). Such users X are users within the range of the information request level of the user A. The user selection processing at step S56-1 is the first user selection processing based on the information acquisition level of the requesting user A.

Next, the information management server 20 checks the information disclosure level of each user X (step S56-2) to determine whether the user A is included in the range of the information disclosure level of each user X (step S56-3). If, as a result of the determination, the user A is determined not to be included in the range of the information disclosure level of each user X, the information management server 20 determines not to disclose viewing information of the user X to the user A (step S56-4). If, on the other hand, the user A is determined to be included in the range of the information disclosure level of each user X, the information management server 20 determines to disclose viewing information of the user X to the user A (step S56-5).

More specifically, the information management server 20 first reads information disclosure level information (information disclosure level value) of each user X and user correlation function (closeness level value) of each user X with respect to the user A set in the group DB 216 to compare the closeness level value of each user X with respect to the user A with the information disclosure level value of each user X. In accordance with a comparison result thereof, the information management server 20 selects users X whose closeness level value with respect to the user A is equal to or greater than the information disclosure level value of the users X (see FIG. 5). Such users X are users within the range of the information request level of the user A and also users for whom the user A is included within the range of the information disclosure level of these users. The user selection processing at steps S56-2 to S56-4 is the second user selection processing based on the information disclosure level of the other user X.

Next, the information management server 20 extracts viewing information of the user X selected as described above from the user viewing content DB 228 and, based on the extracted information, generates viewing information of the other user X to be provided to the user A (step S56-6) before transmitting the viewing information to the content viewing device 10 of the user A (step S58).

Then, the content viewing device 10 of the user A receives the viewing information of the other user X to be provided to the user A from the information management server 20 and displays the viewing information in parallel with content being viewed (step S60).

In the foregoing, filtering processing according to the present embodiment has been described. Accordingly, privacy can be managed by limiting other users whose viewing information should be disclosed in accordance with user settings and also the range of other users from whom acquisition of viewing information is desired by a user can be adjusted.

Next, a display example of viewing information of other users in the content viewing device 10 according to the present embodiment will be described.

As described in FIG. 3, the content viewing device 10 can display viewing information of other users acquired from the information management server 20 in a display screen of the display unit 132 in parallel with video of content being reproduced. At this point, the viewing information display control unit 146 of the content viewing device 10 can identify other users viewing the same content as content viewed by the user of the local device based on viewing information of other users received from the information management server 20. Then, the viewing information display control unit 146 causes the display unit 132 to display user information representing the identified other users. The user information that can identify each of other users may be used, for example, text information representing other users (for example, user names and text representing nicknames), images (for example, face photos of other users and portraits), icons (for example, pictorial symbols representing faces of other users), marks, figures, symbols, and characters. An example in which face icons are used as user information will mainly be described below, but the present invention is not limited to this example.

FIGS. 22 to 26 are explanatory diagrams showing examples of the display screen of viewing information of other users displayed together with content being reproduced in the content viewing device 10 according to the present embodiment.

Figure 22:
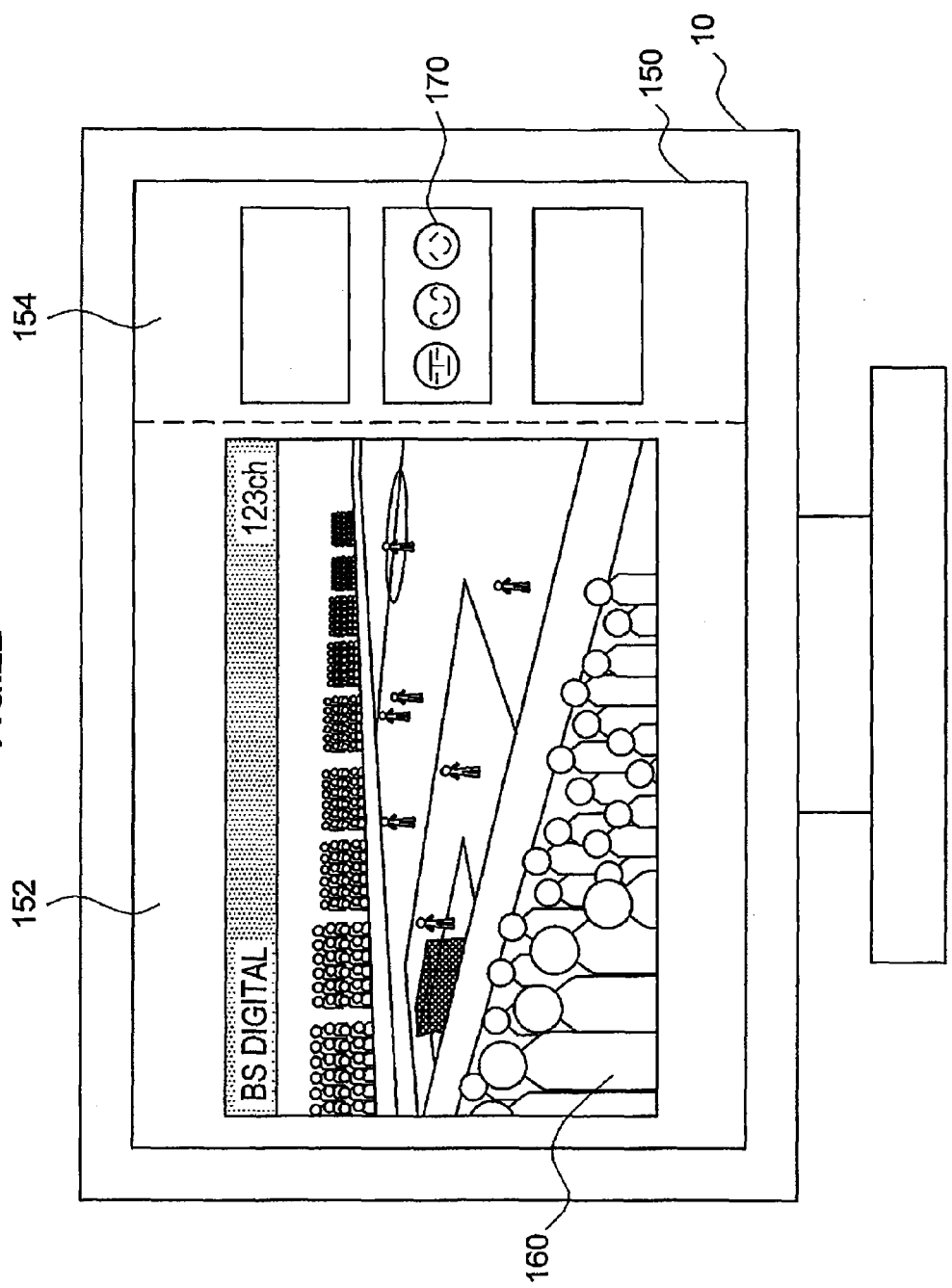
FIG. 22 is an explanatory diagram showing a display screen example of the content viewing device according to the first embodiment.

In the example in FIG. 22, video 160 of content currently being reproduced (for example, program content being broadcast) and face icons 170 (corresponding to the user information) representing three other users viewing the content are displayed in the in a display screen 150 of the content viewing device 10. Accordingly, the user A of the content viewing device 10 knows that three other users are viewing content of the same channel "display screen 150 BS digital, channel 123" as the user A.

In the example in FIG. 22, a display area of the display screen 150 is divided into a content display area 152 for displaying content being reproduced and an application information display area 154. The application information display area 154 is an area for displaying various kinds of information (for example, the weather forecast, fortunes, and news) provided by applications held by the content viewing device 10. The face icons 170 are displayed in the application information display area 154 and become information provided by a viewing information sharing application held by the content viewing device 10.

Figure 23:
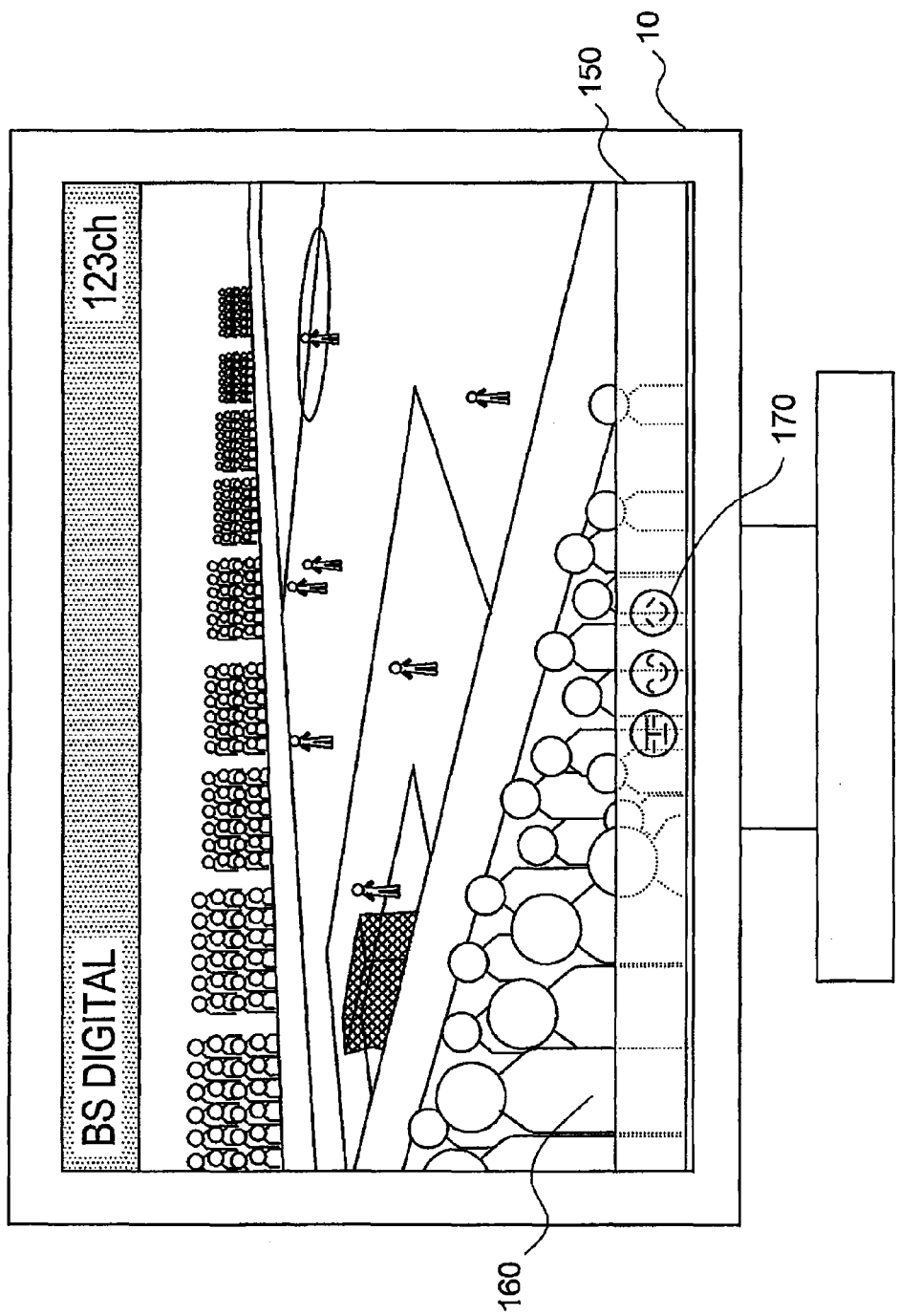
FIG. 23 is an explanatory diagram showing a display screen example of the content viewing device according to the first embodiment.

In the example in FIG. 23, the three face icons 170 are displayed in a form superimposed on video 162 of content currently being reproduced in a lower part of the display screen 150 of the content viewing device 10.

Figure 24:
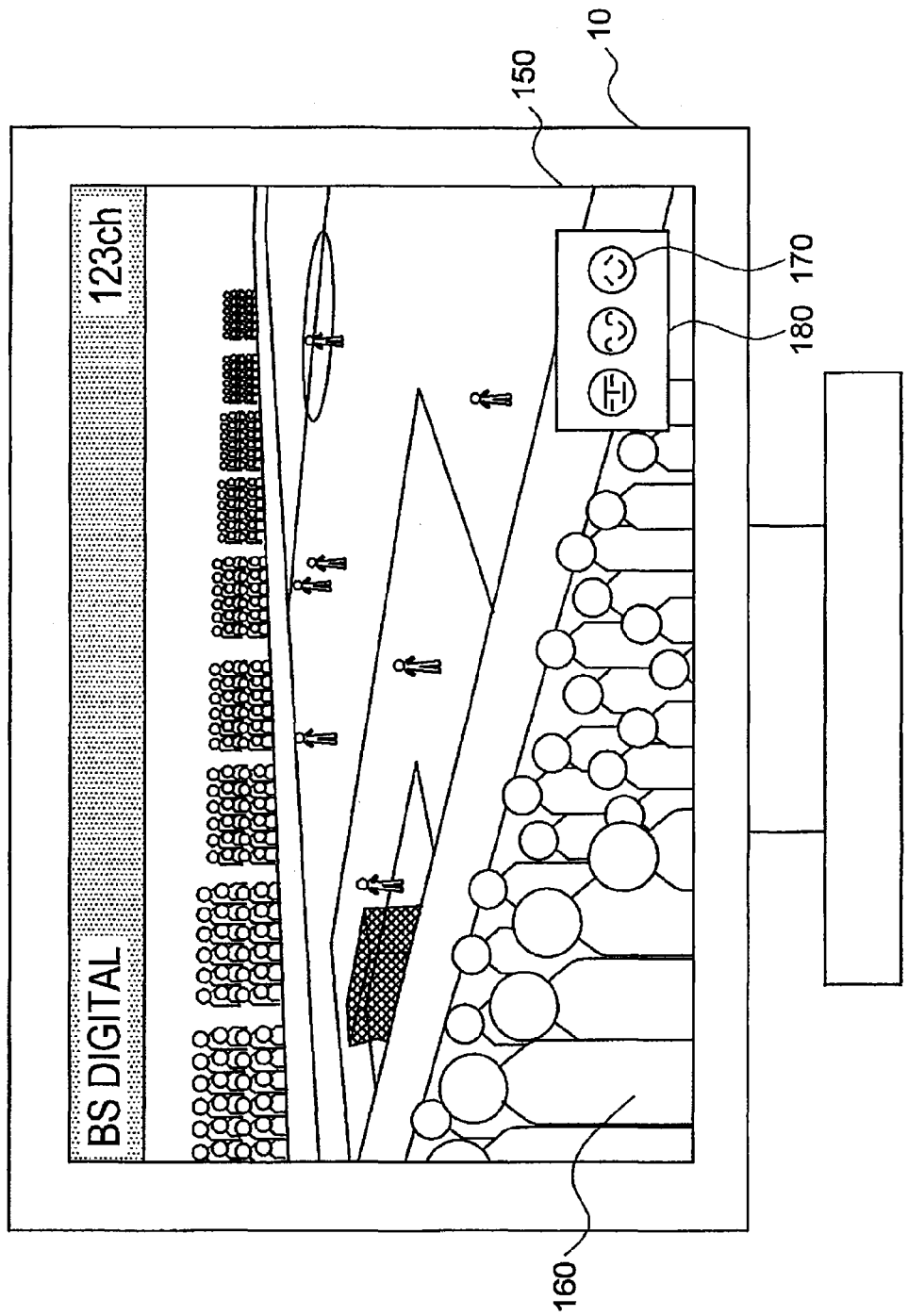
FIG. 24 is an explanatory diagram showing a display screen example of the content viewing device according to the first embodiment.

In the example in FIG. 24, the three face icons 170 are displayed in a user information display area 180 provided in a relatively small rectangular shape in a form superimposed on video 162 of content currently being reproduced in a lower right part of the display screen 150 of the content viewing device 10.

Figure 25:
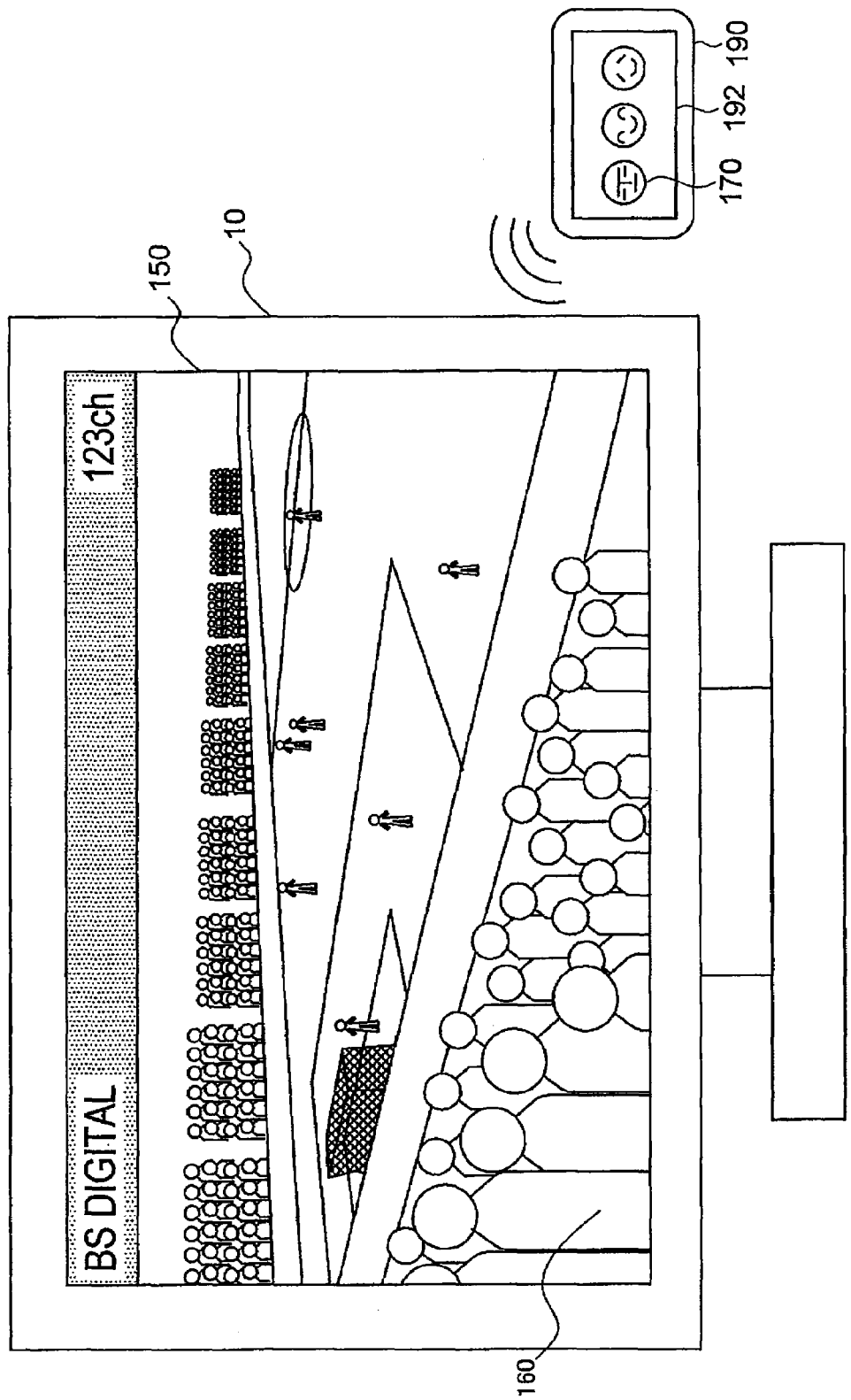
FIG. 25 is an explanatory diagram showing a display screen example of the content viewing device according to the first embodiment.

In the example in FIG. 25, the three face icons 170 representing other users viewing content being reproduced in the content viewing device 10 are displayed in a display screen 192 of a mobile device 190 that can communicate with the content viewing device 10 by radio. The mobile device 190 is, for example, a multi-functional remote controller, PDA, mobile phone, mobile video/audio player, and mobile game machine. In this case, user information of other users is transmitted from the content viewing device 10 to the mobile device 190 so that the user information can be displayed by the content viewing device 10 and the mobile device 190 linked together.

Figure 26:
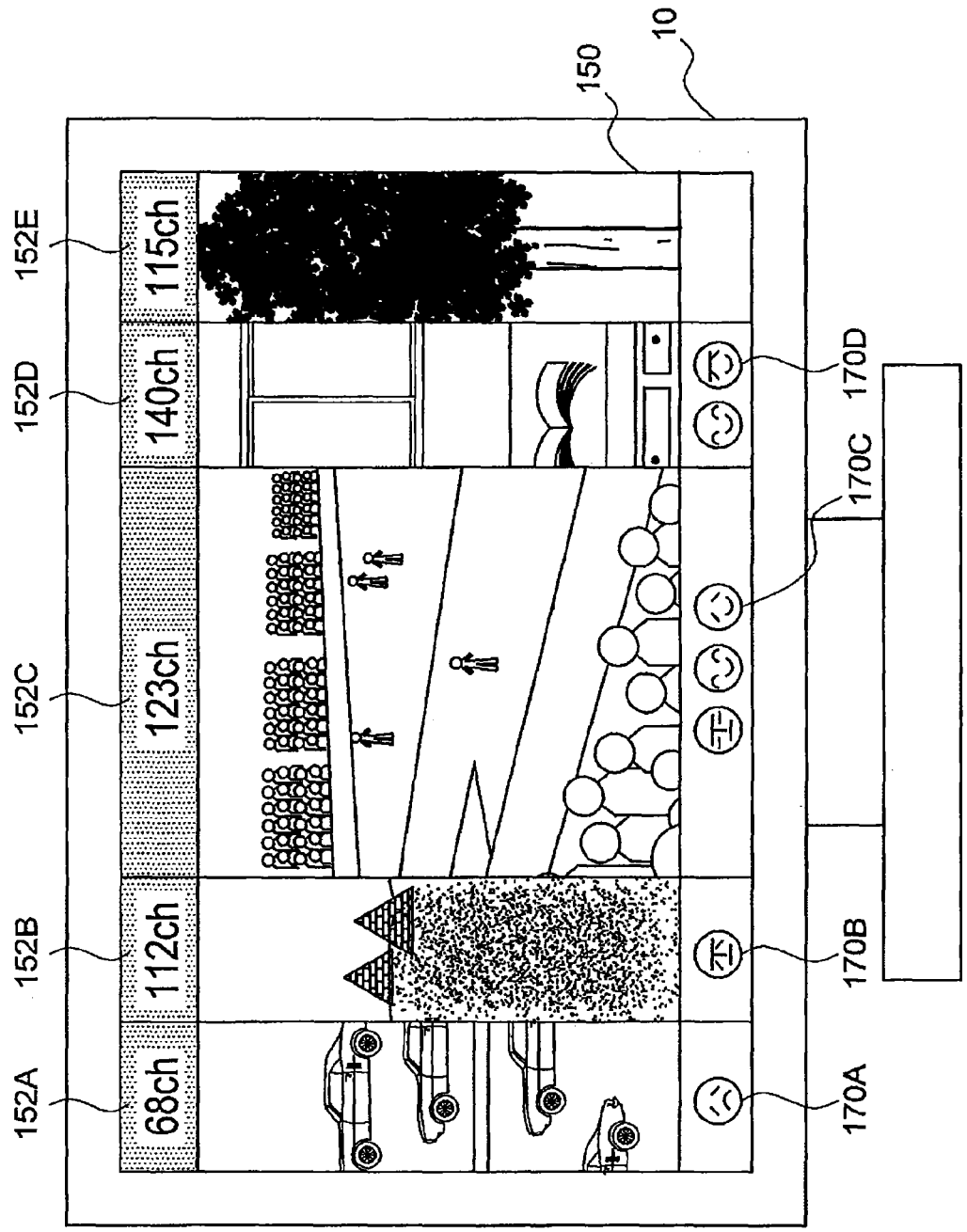
FIG. 26 is an explanatory diagram showing a display screen example of the content viewing device according to the first embodiment.

In the example in FIG. 26, the content display area of the display screen 150 of the content viewing device 10 is divided into a plurality of display areas 152A to 152E to simultaneously display content being broadcast by a plurality of mutually different channels in each of the display areas 152A to 152E. At this point, face icons 170A to 170D of other users viewing content of each broadcasting channel are displayed at location corresponding to each of the display areas 152A to 152D as viewing information of other users. For example, content being broadcast by "channel 123" is displayed in the display area 152C and the face icons 170C of three other users viewing the content are displayed in the lower part of the display area 152C. Content being broadcast by "channel 115" is displayed in the display area 152E, but the face icon 170 is not displayed in the display area 152E because there is no other use who is viewing the content (or there is no other user who discloses viewing information to the user A). Because of the display form of FIG. 26, the user A of the content viewing device 10 can easily and swiftly know presence/absence of other users viewing content of the plurality of mutually different channels and the number of users.

Next, a method of displaying viewing information of other users displayed in program guide form in the content viewing device 10 according to the present embodiment will be described.

The user viewing content DB 228 of the information management server 20 according to the present embodiment has, as described above, a data structure in program guide form. That is, the user viewing content DB 228 has a data structure in which viewing information of a plurality of users is sorted separately according to present content, past content, and future content contained in a program guide and viewing user information is associated with each piece of content. Thus, information in which content and viewing user information are associated can be extracted from the user viewing content DB 228, which is then provided to each of the content viewing devices 10 as viewing information of other users classified and arranged in program guide form. Therefore, the content viewing device 10 of each user can display viewing information of other users by associating with a program guide by receiving viewing information of the other users classified and arranged in program guide form from the information management server 20. Consequently, the user of the content viewing device 10 can easily know viewing information of other users about present, past, and future content by looking at a program guide to which such viewing information of other users is added so that the user can easily and aptly select content the user himself (herself) desires to view.

Such a program guide to which viewing information of other users classified on a content basis is added is generated by the viewing information display control unit 146 (see FIG. 3) of the content viewing device 10 and displayed in the display unit 132. The viewing information display control unit 146 performs image processing so that viewing information of other users classified and arranged in program guide form acquired from the information management server 20 is displayed by associating with individual fields of a program guide. As a result, as shown below, a program guide including viewing information of other users is displayed in the display screen 150 of the content viewing device 10.

Display examples of viewing information of other users displayed in program guide form in the content viewing device 10 according to the present embodiment will be described below with reference to FIGS. 27 to 33.

Figure 27:
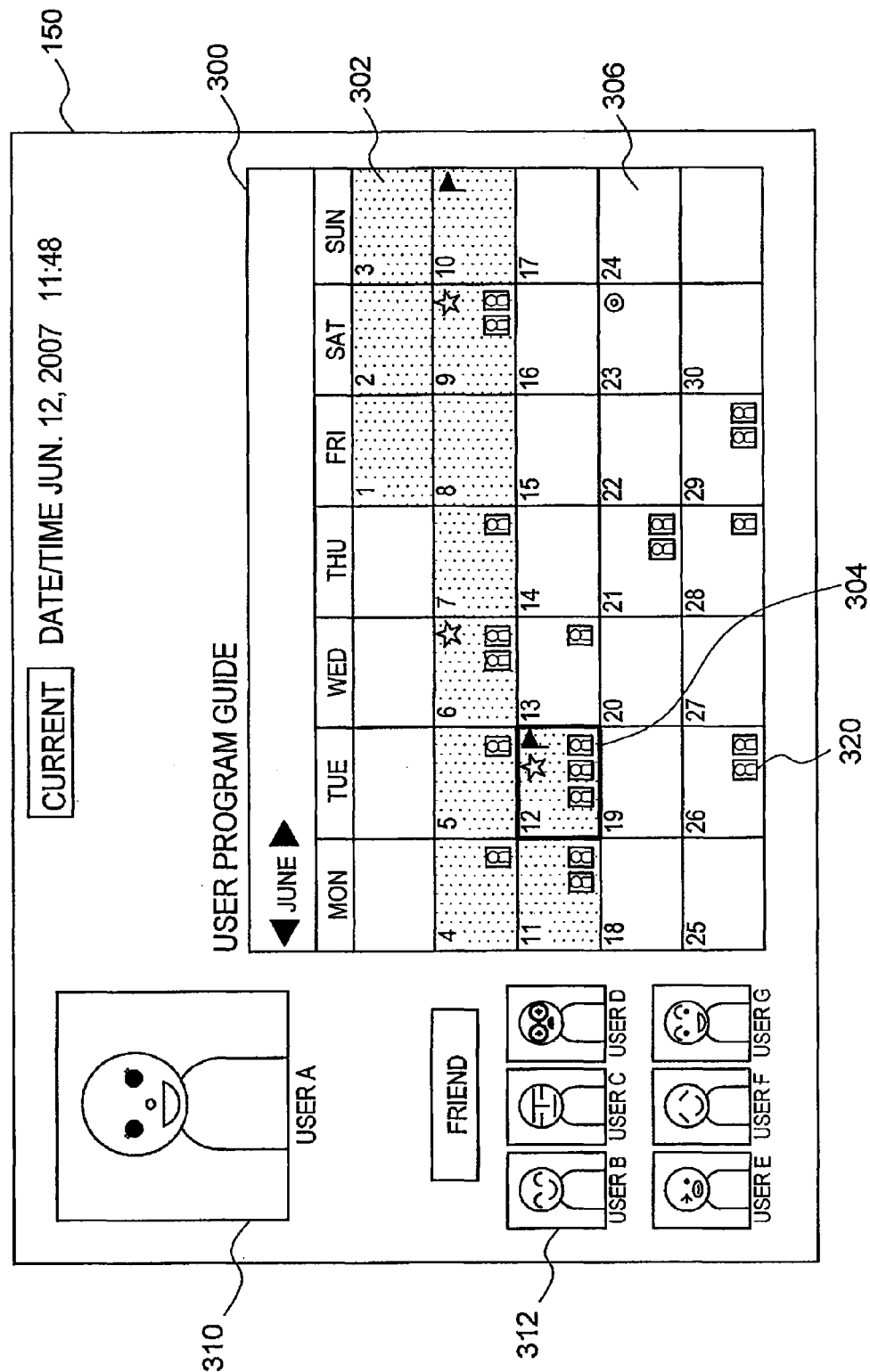
FIG. 27 is an explanatory diagram showing a display example of viewing information of other users displayed in program guide form in the content viewing device according to the first embodiment.

First, a display example of a user program guide 300 in calendar form (in months) shown in FIG. 27 will be described. As shown in FIG. 27, viewing information of other users is displayed in the display screen 150 of the content viewing device 10 of the user A as the user program guide 300 in calendar form. The user program guide 300 in calendar form uses the current time as the reference to color-code the display so that an area 302 (with shading) representing the current and past dates and an area 306 (in white) representing the future date can be distinguished and a frame display 304 is provided to the field of the current date. Accordingly, the user can easily know the arrangement of dates in the user program guide 300. Moreover, an icon 310 of the user A is displayed as information showing the user A himself (herself) next to the user program guide 300 and icons 312 of users B to G registered in the same group as the user A are displayed below the icon 310.

The user program guide 300 in calendar form lists viewing information of other users for each date of a month. That is, in the field of each date of the user program guide 300 in calendar form, information of other users who have viewed/are viewing/plan to view/are predicted to view content on that date is displayed as icons 320.

In the field of June 6, which is a past date, for example, the icons 320 of two other users who viewed content on that date are displayed. In the field of June 12, which is a present date, the icons 320 of three other users who view content today or are currently viewing content are displayed. In the field of June 26, which is a future date, the icons 320 of two other users who plan to view content on that date (for example, who have made a viewing setting or recording setting for that date) are displayed. The icons 320 of the future-predicted other users are also displayed in the fields of future dates.

By displaying the icon 320, which is viewing information of other users, and the dates by associating the icon 320 and the dates in the user program guide 300 in calendar form, viewing tendencies of each user such as on which day of a month (for example, what day of the week and the first half of a month) each user often views content can be known in dates. For example, the user A can know at-home days of the user B, who is a lover of the user A, and days of the week when the user B often watch TV broadcasting to better understand hobbies and behavioral patterns of the user B by searching for the icon 320 of the user B.

Figure 28:
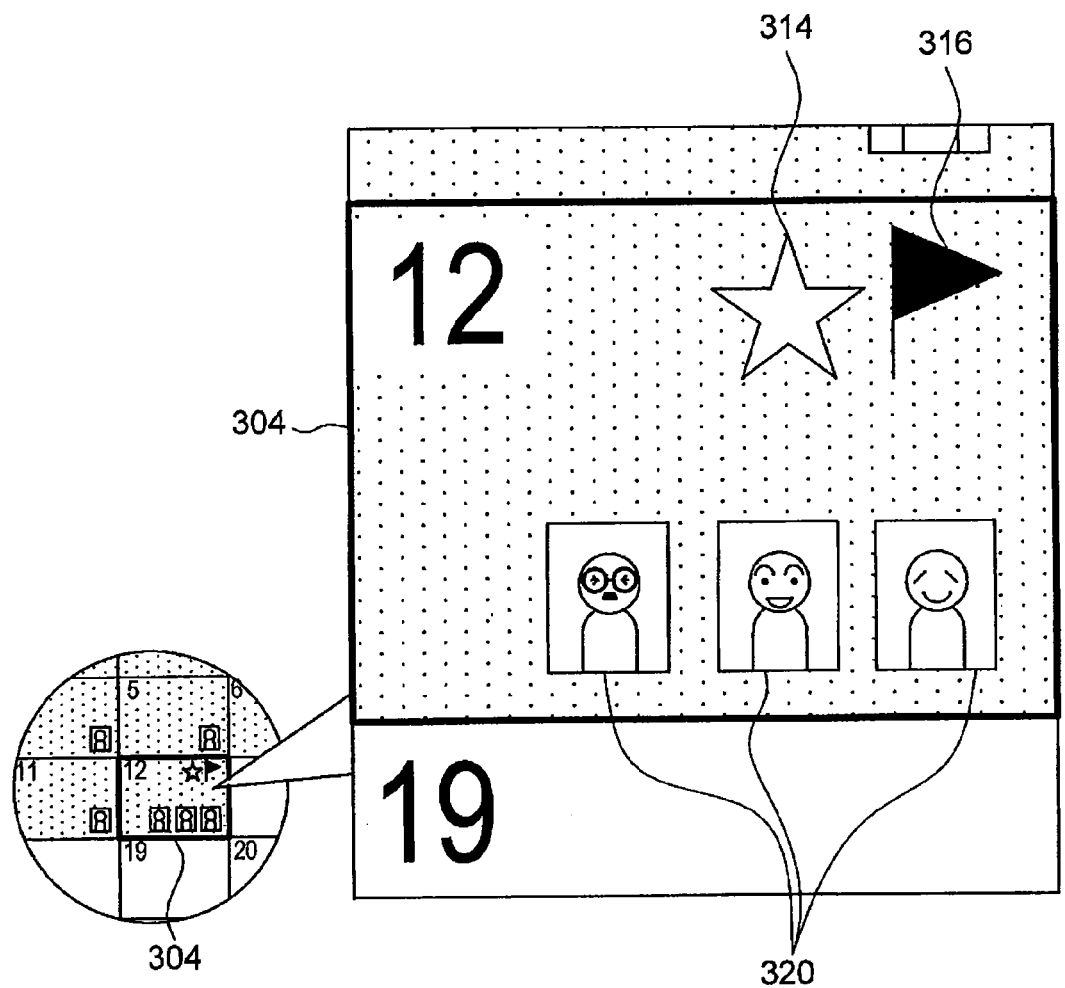
FIG. 28 is a partially enlarged view of FIG. 27.

FIG. 28 is an enlarged view of the field of June 12 (field in which a display frame 304 is provided), which is the present date, in the user program guide 300. As shown in FIG. 28, the icons 320 of three other users D, F, and G who viewed content today or are currently viewing content are displayed in the present date field. Accordingly, the user A can know that the users D, F, and G are at home to view content. In addition, marks 314 and 316 indicating a viewing history of the user A or the like are also displayed in the field. For example, the star-shaped mark 314 is a mark indicating that the user A has viewed content today and the flag-shaped mark 316 is a mark indicating that that user A has recorded content for today by making a recording setting. By displaying the marks 314 and 316 representing a viewing history of the user A himself (herself), the user A can check a viewing schedule of the user A himself (herself).

Figure 29:
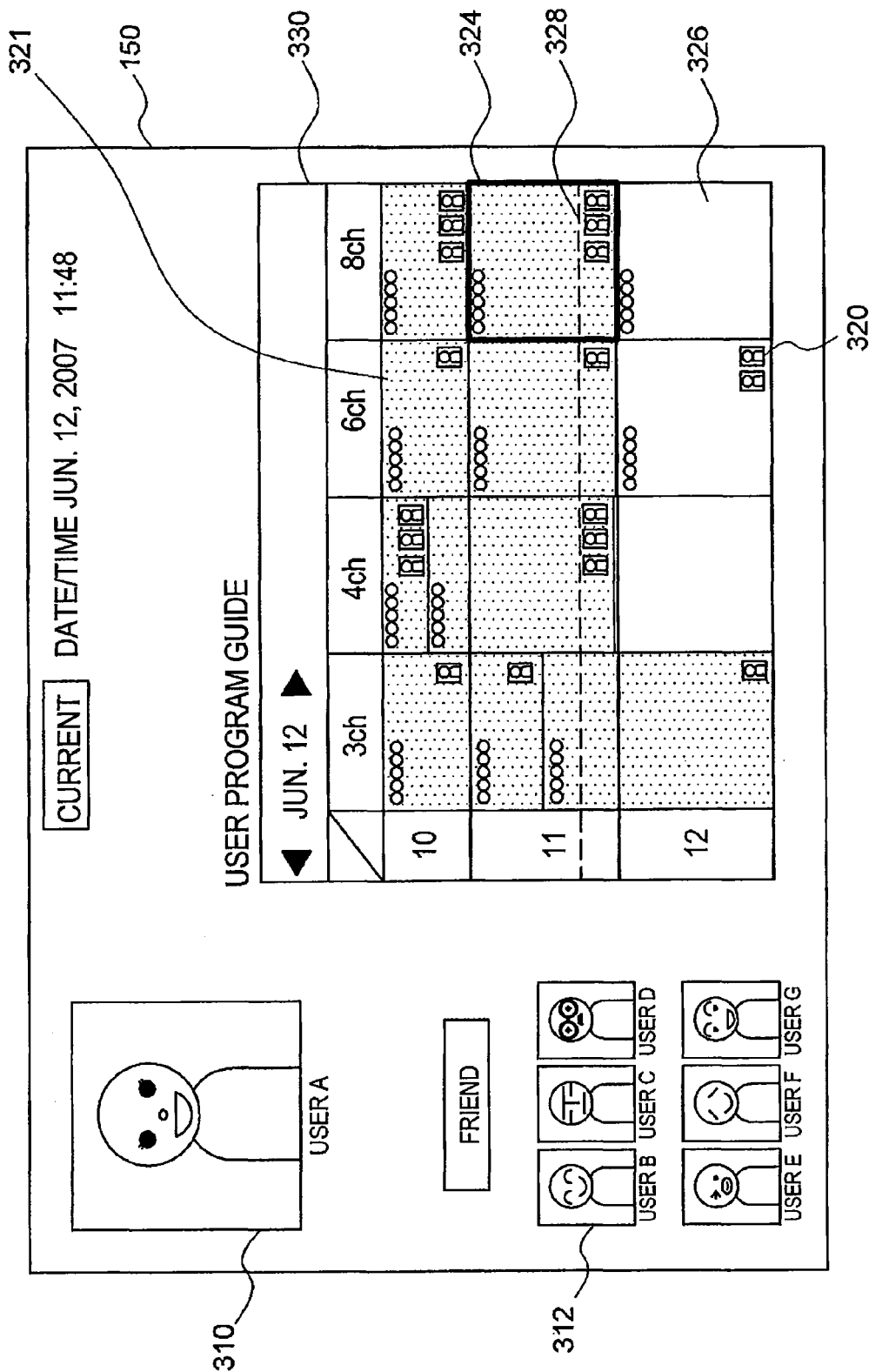
FIG. 29 is an explanatory diagram showing a display example of the viewing information of other users displayed in program guide form in the content viewing device according to the first embodiment.

If the user A selects the field of some date in the user program guide 300 in which viewing information in dates is displayed in calendar form as described above, a user program guide 330 in dates for the selected date is displayed (see FIG. 29).

Figure 30:
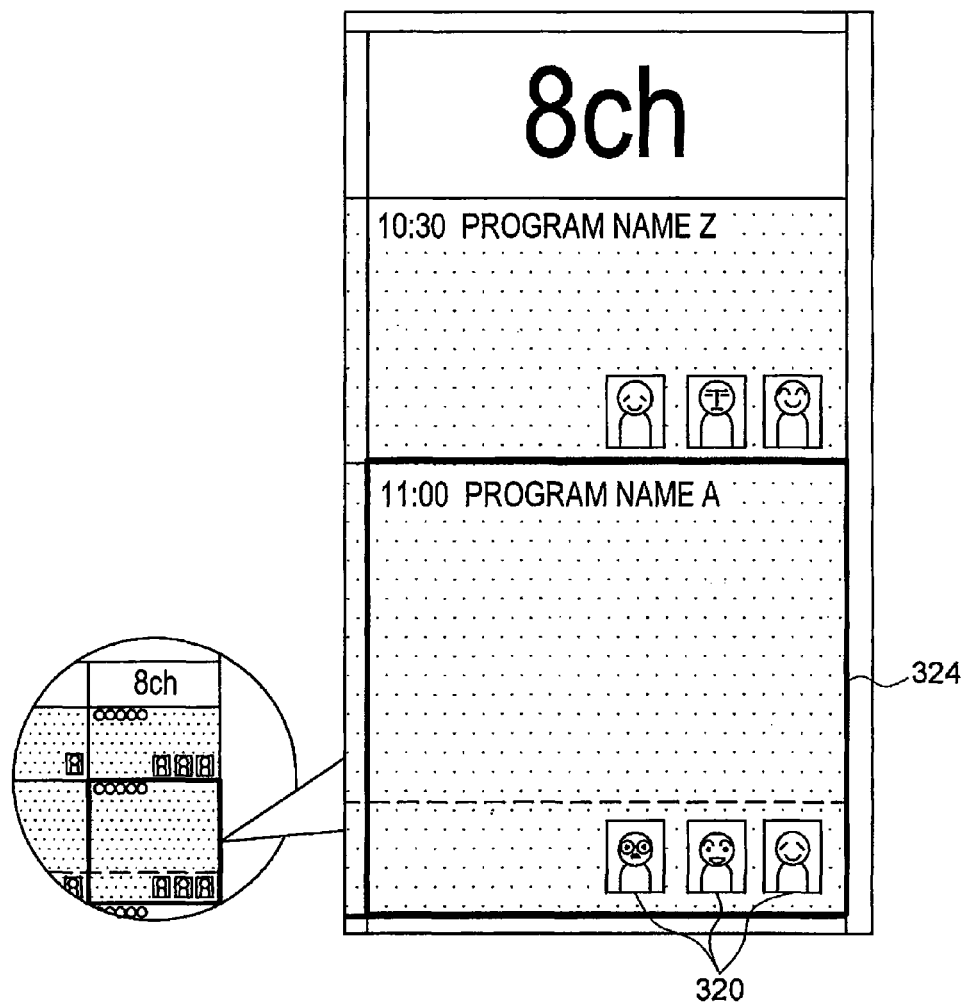
FIG. 30 is a partially enlarged view of FIG. 29.

Next, a display example of the user program guide 330 in dates shown in FIG. 29 will be described. FIG. 30 is an enlarged view of a portion of FIG. 29. As shown in FIG. 29, like a general electronic program guide, the user program guide 330 in dates is a program guide in which content of each broadcasting channel is chronologically arranged. In this program guide, content broadcast to the content viewing device 10 is arranged by classifying the content in tabular form by broadcasting channel and by time zone.

The user program guide 330 in dates is displayed in such a way that an area 321 (with shading) representing content already started to broadcast and an area 326 (in white) representing content not yet broadcast can be distinguished with the current time being used as the reference and also a line 328 indicating the current time is displayed. Further, a frame display 324 is provided to content currently being viewed (that is, content being broadcast by the channel currently tuned in to). Accordingly, the user A can easily know whether or not content in the user program guide 330 has started to broadcast and content the user A himself (herself) is currently viewing. Moreover, like FIG. 27, the icon 310 of the user A and the icons 312 of the users B to G belonging to the same group as the user A are displayed next to the user program guide 330.

In a field representing each piece of content in the user program guide 330, information of other users who have viewed/are viewing/plan to view/are predicted to view content in that field is displayed by the icon 320. For example, in the field of content in the past whose broadcasting started at 10 in "channel 3", the icon 320 of one other user who viewed the content in the past is displayed. In the field of content whose broadcasting started at 11 in "channel 8" and is currently continuing, the icons 320 of three other users who are currently viewing the content are displayed. In the field of content to be broadcast in the future whose broadcasting will start at 12 in "channel 6", the icons 320 of two other users who plan to view (or are predicted to view) the content in the future are displayed. FIG. 30 is an enlarged view of the field to which the frame display 324 is provided in FIG. 29 and, as shown in FIG. 30, the icons 320 of three other users D, F, and G who are currently viewing the content and also the broadcast start time "11:00" and "Program name A" of the content are displayed in the field of the content currently being viewed.

In the user program guide 330 in dates, as described above, the icon 320, which is viewing information of other users, is displayed by associating with content in each channel and each time zone. Accordingly, the user A can know which content other users in the group have viewed/are viewing/plan to view on that date. Particularly if the user A can know other users who are viewing the currently viewing content, the conversation about the content with the other users will become lively.

Also, if other users who are friends of the user A are viewing content of a channel different from that of the user A, an opportunity is given to the user A to switch the channel to view the same content as the friends. Moreover, if other users who are friends of the user A plan to view content to be broadcast tonight, an opportunity is given to the user A to view the content, which is unknown to the user A.

Figure 31:
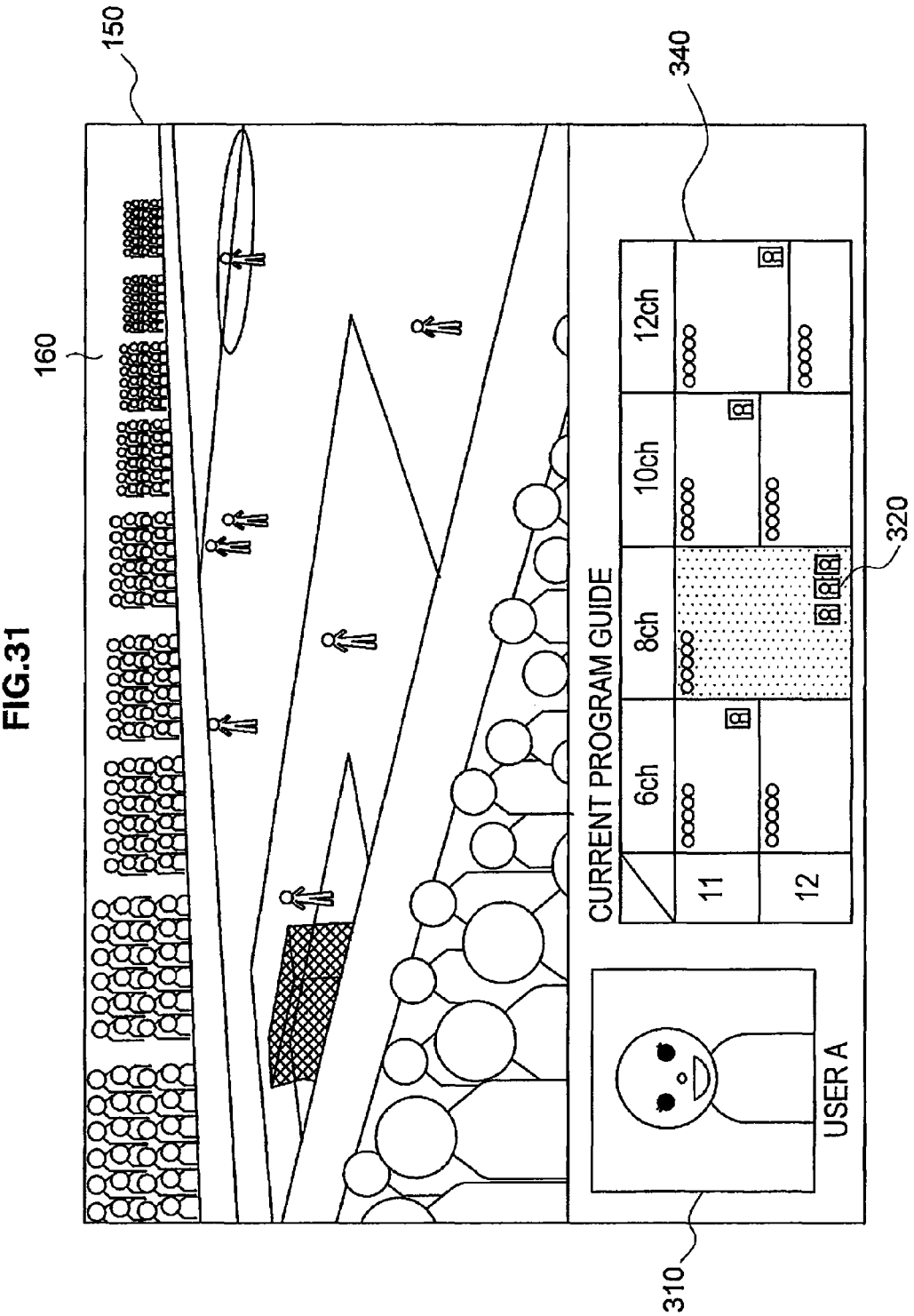
FIG. 31 is an explanatory diagram showing a display example of the viewing information of other users displayed in program guide form in the content viewing device according to the first embodiment.

Next, display examples of user program guides 340 and 350 about content currently being broadcast will be described with reference to FIG. 31 and FIG. 32. FIG. 31 shows the user program guide 340 representing a plurality of channels and FIG. 32 shows the user program guide 350 representing a single channel.

Figure 32:
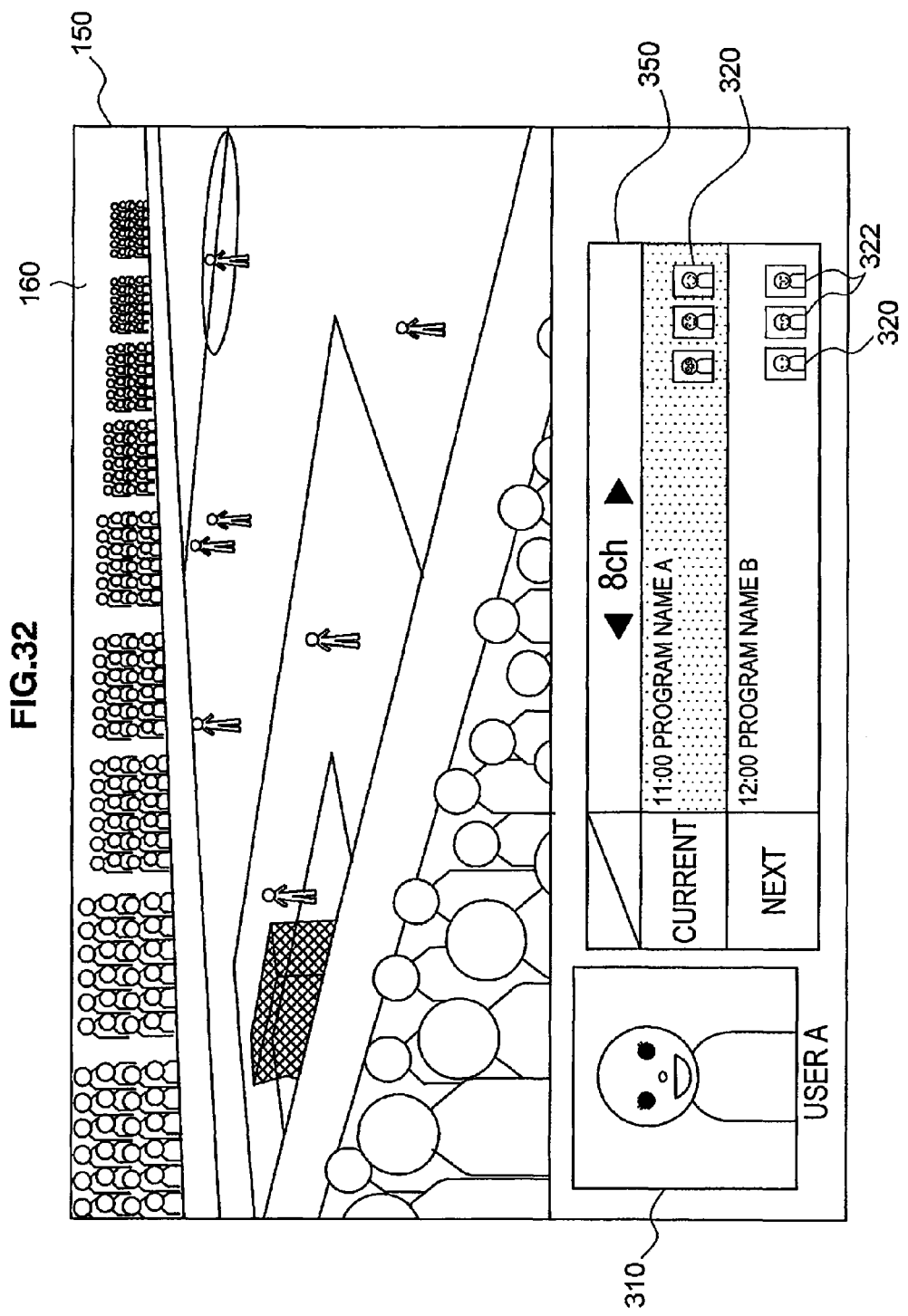
FIG. 32 is an explanatory diagram showing a display example of the viewing information of other users displayed in program guide form in the content viewing device according to the first embodiment.

In the display screen 150 of the content viewing device 10, as shown in FIG. 31 and FIG. 32, the video 160 (video of a soccer game) of content of "channel 8" currently being viewed by the user A is displayed in the upper part of the screen and the icon 310 of the user A and the user program guides 340 and 350 are displayed in the lower part of the screen. By displaying the video 160 currently being viewed by the user A and the user program guides 340 and 350 in parallel in this manner, the user A can know viewing information of other users about programs currently being broadcast while viewing the content.

Like the user program guide 330 in FIG. 29, the user program guide 340 in FIG. 31 is a program guide in which content of a plurality of broadcasting channels is chronologically arranged and displays program content of the plurality of channels currently being broadcast in program guide form. In the user program guide 340, information of other users who are currently viewing content represented a field of each channel is displayed in the field by the icon 320.

For example, in the field of content of "channel 8" viewed by the user A, the icons 320 of three other users who are viewing the content are displayed. Thus, the user A can know that the three other users who are friends are viewing the same program content as the user A. Also in the fields of content of other "channels 6/10", the icon 320 of one other user viewing the content is displayed respectively. Accordingly, the user A can recognize that one other user is viewing program content that is different from that of the user A.

In the user program guide 340, the channel currently being viewed by the user A and other channels may be made easily identifiable by changing the display mode (for example, shading is added, like the illustrated example) or by providing a display frame (not shown) to only the field of content of the channel currently being viewed by the user A.

The user program guide 350 in FIG. 32 is a program guide in which only content of the "channel 8" currently being viewed by the user A is chronologically arranged and information of other channels is left out. Therefore, the user program guide 350 can display information of other users about the "channel 8" currently being viewed by the user A larger and in more detail. In the user program guide 350, information of other users who are currently viewing/plan to view or are predicted to view in the future content represented by a field is displayed by the icon 320 and an icon 322 in the field representing content in each time zone regarding one channel currently being viewed. Accordingly, the user A can know viewing information of other users of the channel currently being viewed by the user A.

In FIG. 32, the icon 322, which is different from the normal icon 320, is used as viewing information of other users regarding future content. The icon 322 represents a result of a future prediction of content by the user viewing prediction unit 232 (see FIG. 7) of the information management server 20. In the present embodiment, as described above, attributes of viewing information of other users provided to the content viewing device 10 include "planned viewing" and "future prediction". "Planned viewing" is information representing planned viewing of future content by the user and is determined based on setting information such as viewing settings and recording settings made by the user. "Future prediction", on the other hand, is information representing future prediction of future content by the user and is predicted by calculating a viewing probability based on a viewing history of the user and attribute information of content. Thus, "planned viewing" and "future prediction" have different properties.

Figure 33:
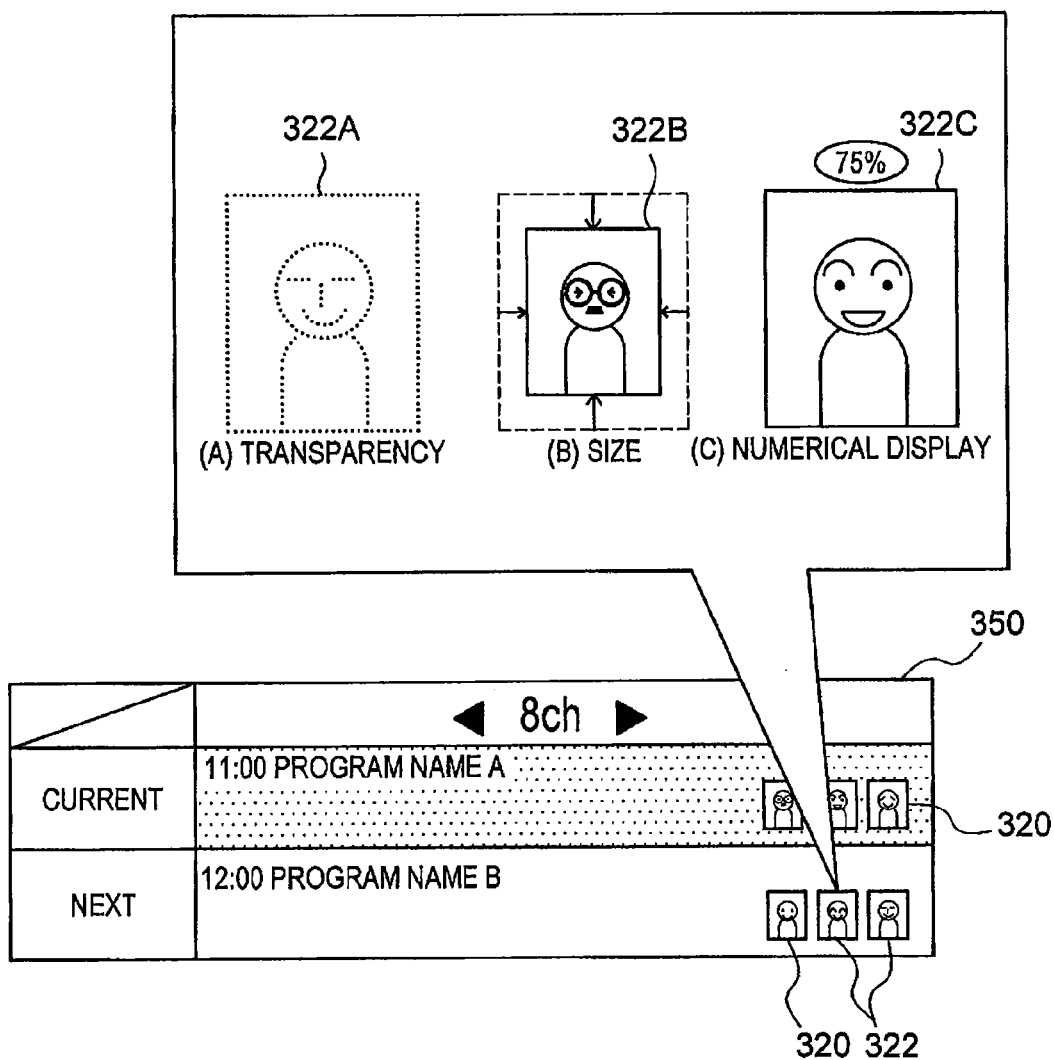
FIG. 33 is an explanatory diagram showing a method of displaying a viewing probability of other users in the content viewing device according to the first embodiment.

Here, a display example of future prediction results of future content in the display screen 150 of the content viewing device 10 will be described with reference to FIG. 33. FIG. 33 is an enlarged view of FIG. 32. As shown in FIG. 33, the icon 322 representing a future prediction result of content by a user is displayed in a form reflecting the viewing probability of future content by the user. Such forms include (A) the transparency of the icon 322 is changed in accordance with the viewing probability, (B) the size of the icon 322 is changed in accordance with the viewing probability, (C) the probability is shown next to the icon 322.

In the form of (A), the icon 322 is displayed with increasing transparency as the predicted viewing probability of content increases. If, for example, the viewing probability is 100%, the transparency is 100% and the opaque icon 322 is displayed. If the viewing probability is 0%, the transparency is 0% and the icon 322 becomes invisible. In the illustrated example, the viewing probability is 75% and the icon 322 is displayed with 75% of transparency (depth) of the normal icon 320.

In the form of (B), the icon 322 is displayed with an increasing size as the predicted viewing probability of content increases. If, for example, the viewing probability is 100%, the icon 322 of the size of 100% is displayed. If the viewing probability is 0%, the icon 322 becomes invisible. In the illustrated example, the viewing probability is 75% and the icon 322 is displayed with the size of 75% of the normal icon 320.

In the form of (C), text information representing the predicted viewing probability of content is displayed next to the icon 322. Accordingly, the user can accurately know the value of the viewing probability.

By changing the display mode of viewing probability of other users of the icon 322 and the like in accordance with the predicted viewing probability, as described above, the user can know not only whether or not other users will view future content, but also viewing probabilities thereof. Thus, the user can use viewing probabilities of other users as a judgment material for selecting future content.

In the foregoing, the information sharing system 1 according to the present embodiment and the information sharing method using thereof have been described in detail. According to the present embodiment, viewing information of users of a plurality of content viewing devices 10 is shared via the information management server 20 and viewing information of other users is provided to each user after being filtered in accordance with viewing content of each user.

Accordingly, when a user views content such as video/audio/games, viewing information of other users who are currently viewing (have viewed/plan to view) the content can be displayed in the screen of the content viewing device 10 in parallel with content information. When viewing program content of TV broadcasting, for example, the user can display viewing information of other users viewing program content of the channel tuned in to by the user in the screen of the content viewing device 10 together with content being viewed.

Therefore, the user can know which user is viewing that content on a content basis. Consequently, the user can get an opportunity to view content such as "If that person is viewing, let's try to view" or an opportunity to view content together with other users such as "If I can view together with that person, let's try to view". Thus, the nature of plan for content viewing is enhanced and usefulness of the content viewing device is increased.

Further, in the present embodiment, the information management server 20 constructs the user viewing content DB 228 in program guide form based on viewing information collected from each of the content viewing devices 10. That is, the user viewing content DB 228 has a data structure in which viewing information of a plurality of users is sorted separately according to present content, past content, and future content contained in a program guide and viewing user information is associated with each piece of content. Thus, the information management server 20 can extract viewing information of other users classified and arranged in program guide form from the user viewing content DB 228 to provide the viewing information to each of the content viewing devices 10. Therefore, the content viewing device 10 of each user can display the user program guides 300, 330, 340, 350 associating viewing information of other users classified and arranged in program guide form acquired from the information management server 20 in parallel with content video or alone.

Thus, each user can easily know viewing information of other users about present, past, and future content by looking at the user program guides 300, 330, 340, 350 so that the user can easily and appropriately select content desired by the user to view. Thus, in the present embodiment, when a user selects content to be viewed by looking at a program guide, the user can select viewing content based on an information source other than program content (that is, viewing information of other users) and therefore, new selection criteria can be created.

Further, the information management server 20 provides not only a viewing history in the past, the present viewing state, and a viewing state in the future, but also future predictions including viewing probabilities calculated based on a predetermined estimation algorithm to each of the content viewing devices 10 as viewing information of each user. Accordingly, the content viewing device 10 can display viewing information of other users extending over the past, present, and future in program guide form.

Thus, users in a group can mutually share information such as planned viewing and future predictions about future content and a judgment material for selecting viewing of future content can be obtained other than substance of content in a program guide. Therefore, an opportunity can be given to view content planned to be broadcast in the future, as well as present content.

The above user program guides 300, 330, 340, 350 extending over the past, present, and future can be used for viewing not only present or future content, but also past content. For example, a user can determine whether or not to view a TV program recorded the previous day by presenting a lineup of other users who viewed the program while being broadcast, comments while being viewed (such as user video/audio), viewing state information, and enthusiasm degree information to the user.

Further, in the present embodiment, shared level information including the information disclosure level and information acquisition level of each user is set in the information management server 20 and, based on the shared level information, viewing information of other users to be provided to each user is filtered. Accordingly, privacy management in accordance with the information disclosure level setting among users can be performed. Also, the user can optionally adjust the range of users from whom viewing information should be acquired by the information acquisition level setting and thus, the range of viewing information can be adjusted in accordance with ideas of the user. Accordingly, for example, the range of acquisition of viewing information can be limited to a group of close users such as family members or conversely, broadened to a group of many users who are not so close such as friends' friends.

In addition, there is a possibility of extending the SNS service that has been specialized to specific devices such as personal computers (PC) and mobile phones in related art to a new user base of non-PC users. Also, users of PCs and mobile phones in related art can feel circumstances or signs of what other users such as family members and friends are doing through the content viewing device 10 (such as a TV set). Thus, enhanced convenience, as compared with that of devices such as PCs and mobile phones whose activation time or display size is limited, can be provided.

It should be understood by those skilled in the art that various modifications, combinations, sub-combinations, and alterations may occur depending on design requirements and other factors insofar as they are within the scope of the appended claims or the equivalents thereof.

In the above embodiment, for example, an example of program content of TV broadcasting has been taken as content to be viewed in the content viewing device 10, but the present invention is not limited to such an example. For example, the present invention can also be applied when a user of the content viewing device 10 views an optional piece of content such as other video content, music content, games, and electronic libraries.

The program guide in the present invention is not limited to an example of a program guide constituted by EPG according to the above embodiment or the like and optional schedule information in which a schedule of content commonly viewable among a plurality of the content viewing devices 10 is set can be used. For example, the program guide includes a schedule table of delivery content from the content delivery server 9 and a program guide of radio broadcasting. The program guide in the present invention can also be applied when a viewing schedule is shared by a group scheduler or the like in advance by coordinating the viewing time of shared content among users of a group. Thus, the program guide may be not only public program guides distributed from broadcasting stations to the public, but also private schedule tables in which viewing plans of content are optionally set among users.

Information disclosure level information and information acquisition level information are set in the above embodiment, but it is also allowed to set only one of the two types of information. Level value settings of such information are not limited to five and an optional number of level values may be set.

In the above embodiment, information of other users viewing content currently being broadcast is displayed while the content currently being broadcast is viewed, but the present invention is not limited to such an example. For example, when content recorded in the past is viewed, information of other users who viewed the content (or who had made a recording setting of the content) may be displayed. Accordingly, the user can determine whether or not to view the recorded content with reference to a viewing history of other users.

What is claimed is:

1. An information processing apparatus communicable with a plurality of content viewing devices via a network, comprising:
a viewing information receiving unit configured to receive from each of the content viewing devices viewing information, said viewing information including information representing at least one of content previously received by the respective content viewing device, content being received by the respective content viewing device at present, and content to be received by the respective content viewing device in the future, said viewing information further including enthusiasm information representing at least one of an impression of the past content or the present content, a viewing state, and feelings;
a processing unit configured to manage a user viewing content database based on the viewing information received from each of the content viewing devices, and a program guide indicating a plurality of contents available to each of the content viewing devices, wherein
the user viewing content database associates, in a form of a program guide, past, present, and future contents represented in the program guide and identification information of users associated with at least one of the content viewing devices that at least one of received the past content, are receiving the present content, and may receive the future content,
the processing unit further configured to calculate a viewing probability that the future content will be received by respective content viewing devices based on the viewing information received from each of the content viewing devices and attribute information of content contained in the program guide;
an acquisition request receiving unit configured to receive a request from a requesting content viewing device associated with the identification information of one of the users for viewing information of identification information of another user,
the processing unit further configured to extract from the user viewing content database the viewing information of the identification information of the another user including information representing content received by one of the content viewing devices associated with the identification information of the another user in the past, at the present, and in the future, and further including enthusiasm information representing at least one of an impression of the past content or the present content, a viewing state, and feelings, in response to the request for the viewing information of the identification information of the another user; and
a viewing information transmitting unit configured to transmit the extracted viewing information of the identification information of the another user to the requesting content viewing device, the viewing information of the identification information of the another user indicating the viewing probability that the future content will be received by one of the content viewing devices associated with the identification information of the another user,
wherein the viewing probability is based on PRG and UM, PRG being a vector representing characteristics of the future content and including at least one of a genre of the future content, a performer of the future content, and a keyword extracted from comments of the future content, UM being a vector determined by a learning processing of at least one of a performer, a keyword, and a genre, wherein the viewing probability is defined by $$\text{Viewing probability (UM,PRG)}=(\Sigma_i(\text{UM}(i)\times \text{PRG}(i)))/(\sqrt{\Sigma_i\text{UM}(i)^2}\times\sqrt{\Sigma_i\text{PRG}(i)^2}).$$

2. The information processing apparatus according to claim 1, wherein the processing unit generates the user viewing content database by associating future content represented in the program guide and a content viewing device predicted by the processing unit to receive the future content.

3. The information processing apparatus according to claim 2, wherein the processing unit is further configured to calculate the viewing probability based on a predetermined algorithm using the viewing information received from each of the content viewing devices and the attribute information of content contained in the program guide, and
the processing unit is configured to generate the user viewing content database by associating future content represented in the program guide and information about the viewing probability calculated by the processing unit.

4. An information processing method employed in an information processing apparatus communicable with a plurality of content viewing devices via a network, comprising:
receiving, from each of the plurality of content viewing devices, viewing information including information on at least one of past received content, presently received content, and content to be received in the future, said viewing information further including enthusiasm information representing at least one of an impression of the past content or the present content, a viewing state, and feelings;
managing a user viewing content database based on the viewing information received from at least one of the content viewing devices, and a program guide indicating a plurality of contents available to each of the content viewing devices,
the user viewing content database associating, in a form of a program guide, past, present, and future contents represented in the program guide and identification information of users associated with at least one of the content viewing devices that at least one of received the past content, are receiving the present content, and may receive the future content;
calculating a viewing probability that the future content will be received by respective content viewing devices based on the viewing information received from each of the content viewing devices and attribute information of content contained in the program guide;
receiving a request from a requesting content viewing device associated with the identification information of one of the users for viewing information of identification information of another user;
extracting the viewing information of the identification information of the another user including information representing content received by one of the content viewing devices associated with the identification information of the another user in the past, at the present, and in the future, and further including enthusiasm information representing at least one of an impression of the past content or the present content, a viewing state, and feelings, from the user viewing content database in response to the request for the viewing information of the identification information of the another user from the requesting content viewing device; and transmitting the extracted viewing information of the identification information of the another user to the requesting content viewing device, the viewing information of the identification information of the another user indicating the viewing probability that the future content will be received by one of the content viewing devices associated with the identification information of the another user, wherein the viewing probability is based on PRG and UM, PRG being a vector representing characteristics of the future content and including at least one of a genre of the future content, a performer of the future content, and a keyword extracted from comments of the future content, UM being a vector determined by a learning processing of at least one of a performer, a keyword, and a genre, wherein the viewing probability is defined by Viewing probability (UM,PRG)=$(\Sigma_i(UM(i) \times PRG(i)))/(\sqrt{\Sigma_i UM(i)^2} \times \sqrt{\Sigma_i PRG(i)^2})$.

5. The method of claim 4, wherein the calculating is performed with a user viewing prediction unit, and the method further comprises:

generating data for the user viewing content database by associating future content represented in the program guide and a content viewing device predicted to receive the future content.

6. The method of claim 5, wherein the calculating calculates the viewing probability based on a predetermined algorithm using the viewing information received from each of the content viewing devices and the attribute information of content contained in the program guide, and the generating includes generating the user viewing content database by associating future content represented in the program guide and information about the viewing probability calculated by the calculating.

7. A non-transitory, computer program product having instructions that when read by a CPU cause an information processing apparatus communicable with a plurality of content viewing devices via a network to execute a method comprising:

receiving, from each of the plurality of content viewing devices, viewing information including information on at least one of past received content, presently received content, and content to be received in the future, said viewing information further including enthusiasm information representing at least one of an impression of the past content or the present content, viewing state, and feelings;

managing a user viewing content database based on the viewing information received from at least one of the content viewing devices, and a program guide indicating a plurality of contents available to each of the content viewing devices, the user viewing content database associating, in a form of a program guide, past, present, and future contents represented in the program guide and identification information of users associated with at least one of the content viewing devices that at least one of received the past content, are receiving the present content, and may receive the future content;

calculating a viewing probability that the future content will be received by respective content viewing devices based on the viewing information received from each of the content viewing devices and attribute information of content contained in the program guide;

receiving a request from a requesting content viewing device associated with the identification information of one of the users for viewing information of identification information of another user;

extracting the viewing information of the identification information of the another user including information representing content received by one of the content viewing devices associated with the identification information of the another user in the past, at the present, and in the future, and further including enthusiasm information representing at least one of an impression of the past content or the present content, a viewing state, and feelings, from the user viewing content database in response to the request for the viewing information of the identification information of the another user from the requesting content viewing device; and transmitting the extracted viewing information of the identification information of the another user to the requesting content viewing device, the viewing information of the identification information of the another user indicating the viewing probability that the future content will be received by one of the content viewing devices associated with the identification information of the another user, wherein the viewing probability is based on PRG and UM, PRG being a vector representing characteristics of the future content and including at least one of a genre of the future content, a performer of the future content, and a keyword extracted from comments of the future content, UM being a vector determined by a learning processing of at least one of a performer, a keyword, and a genre, wherein the viewing probability is defined by Viewing probability (UM,PRG)=$(\Sigma_i(UM(i) \times PRG(i)))/(\Sigma_i UM(i)^2 \times \sqrt{\Sigma_i PRG\ (i)^2})$.

8. The non-transitory, computer program product of claim 7, wherein the calculating is performed with a user viewing prediction unit, and the method further comprises:

generating data for the user viewing content database by associating future content represented in the program guide and a content viewing device predicted to receive the future content.

9. The non-transitory, computer program product of claim 8, wherein the calculating calculates the viewing probability based on a predetermined algorithm using the viewing information received from each of the content viewing devices and the attribute information of content contained in the program guide, and the generating includes generating the user viewing content database by associating future content represented in the program guide and information about the viewing probability calculated by the calculating.

10. An information sharing system, comprising:

a plurality of content viewing devices configured to display content provided by a content providing device; and an information processing apparatus communicable with the content viewing devices via a network, wherein the information processing apparatus includes a viewing information receiving unit configured to receive from each of the content viewing devices viewing information, said viewing information including information representing at least one of content previously received by the respective content viewing device, content being received by the respective content viewing, device at present, and content to be received by the respective content viewing device in the future, said viewing information further including enthusiasm information representing at least one of an impression of the past content or the present content, a viewing state, and feelings, a processing unit configured to manage a user viewing content database based on the viewing information received from each of the content viewing devices, and a program guide indicating a plurality of contents available to each of the content viewing devices, wherein the user viewing content database associates, in a form of a program guide, past, present, and future contents represented in the program guide and identification information of users associated with at least one of the content viewing devices that at least one of received the past content, are receiving the present content, and may receive the future content, the processing unit further configured to calculate a viewing probability that the future content will be received by respective content viewing devices based on the viewing information received from each of the content viewing devices and attribute information of content contained in the program guide, an acquisition request receiving unit configured to receive a request from a requesting content viewing device associated with the identification information of one of the users for viewing information of identification information of another user, the processing unit further configured to extract from the user viewing content database the viewing information of the identification information of the another user including information representing content received by one of the content viewing devices associated with the identification information of the another user in the past, at the present, and in the future, and further including enthusiasm information representing at least one of an impression of the past content or the present content, a viewing state, and feelings, from the user viewing content database in response to the request for the viewing information of the identification information of the another user from the requesting content viewing device, and a viewing information transmitting unit configured to transmit the extracted viewing information of the identification information of the another user to the requesting content viewing device, the viewing information of the identification information of the another user indicating the viewing probability that the future content will be received by one of the content viewing devices associated with the identification information of the another user; and the content viewing device includes a viewing information transmitting unit configured to transmit to the information processing apparatus the viewing information including information representing the at least one of content received by the content viewing device in the past, at the present, and in the future, a viewing information receiving unit configured to receive the extracted viewing information of the identification information of the another user from the information processing apparatus, and a display unit configured to display the extracted viewing information of the identification information of the another user as a program guide, wherein the viewing probability is based on PRG and UM, PRG being a vector representing characteristics of the future content and including at least one of a genre of the future content, a performer of the future content, and a keyword extracted from comments of the future content, UM being a vector determined by a learning processing of at least one of a performer, a keyword, and a genre, wherein the viewing probability is defined by Viewing probability $(UM, PRG) = (\Sigma_i(UM(i) \times PRG(i)))/(\sqrt{\Sigma_i UM(i)^2} \times \sqrt{\Sigma_i PRG(i)^2})$.

* * * * *